United States Patent
Ijiri et al.

(10) Patent No.: US 11,745,338 B2
(45) Date of Patent: Sep. 5, 2023

(54) CONTROL APPARATUS, ROBOT, LEARNING APPARATUS, ROBOT SYSTEM, AND METHOD

(71) Applicant: OMRON Corporation, Kyoto (JP)

(72) Inventors: Yoshihisa Ijiri, Tokyo (JP); Yoshiya Shibata, Tokyo (JP); Masashi Hamaya, Tokyo (JP); Kazutoshi Tanaka, Kumamoto (JP); Felix Vondrigalski, Tokyo (JP); Chisato Saito, Tokyo (JP)

(73) Assignee: OMRON Corporation, Kyoto (JP)

( * ) Notice: Subject to any disclaimer, the term of this patent is extended or adjusted under 35 U.S.C. 154(b) by 226 days.

(21) Appl. No.: 17/173,481

(22) Filed: Feb. 11, 2021

(65) Prior Publication Data

US 2021/0283771 A1    Sep. 16, 2021

(30) Foreign Application Priority Data

Mar. 13, 2020 (JP) .................................. 2020-044422

(51) Int. Cl.
*B25J 9/16* (2006.01)
*B25J 13/08* (2006.01)

(52) U.S. Cl.
CPC ............. *B25J 9/163* (2013.01); *B25J 9/1635* (2013.01); *B25J 9/1664* (2013.01); *B25J 9/1697* (2013.01); *B25J 13/082* (2013.01); *B25J 13/088* (2013.01)

(58) Field of Classification Search
CPC ........ B25J 9/163; B25J 9/1635; B25J 9/1664; B25J 9/1697; B25J 13/082; B25J 13/088;

(Continued)

(56) References Cited

U.S. PATENT DOCUMENTS 6,294,890 B1 *  9/2001  Shimada ............... G05B 19/19
                                              318/568.22
2013/0173504 A1 *  7/2013  Tu ......................... G06N 20/00
                                              706/12

(Continued)

FOREIGN PATENT DOCUMENTS

CN    108925231 A1    12/2018
CN    109048924 A     12/2018

(Continued)

OTHER PUBLICATIONS

Office Action dated Aug. 23, 2022 in counterpart Taiwanese Application.

(Continued)

*Primary Examiner* — B M M Hannan
*Assistant Examiner* — Sagar KC
(74) *Attorney, Agent, or Firm* — METROLEX IP LAW GROUP, PLLC

(57) ABSTRACT

A control apparatus of a robot may include a state obtaining unit configured to obtain state observation data including flexible related observation data, which is observation data regarding a state of at least one of a flexible portion, a portion of the robot on a side where an object is gripped relative to the flexible portion, and the gripped object; and a controller configured to control the robot so as to output an action to be performed by the robot to perform predetermined work on the object, in response to receiving the state observation data, based on output obtained as a result of inputting the state observation data obtained by the state obtaining unit to a learning model, the learning model being learned in advance through machine learning and included in the controller.

16 Claims, 16 Drawing Sheets

(58) Field of Classification Search
CPC ........ B25J 9/1602; B25J 9/1605; B25J 13/08; B25J 9/10; B25J 9/161; B25J 17/02; B25J 9/1687; G05B 2219/39575; G05B 2219/40032; G05B 2219/40499; G06N 20/00

See application file for complete search history.

(56) References Cited

U.S. PATENT DOCUMENTS

| | | | |
|---|---|---|---|
| 2015/0290795 A1* | 10/2015 | Oleynik | B25J 9/0081 700/257 |
| 2015/0306767 A1* | 10/2015 | Saito | B25J 9/1676 901/1 |
| 2016/0059412 A1* | 3/2016 | Oleynik | B25J 9/0018 700/250 |
| 2017/0305014 A1* | 10/2017 | Gildert | B25J 9/161 |
| 2018/0029222 A1 | 2/2018 | Oleynik | |
| 2018/0043526 A1 | 2/2018 | Oleynik | |
| 2018/0147718 A1 | 5/2018 | Oleynik | |
| 2018/0222058 A1* | 8/2018 | Mizobe | B25J 9/163 |
| 2018/0257219 A1 | 9/2018 | Oleynik | |
| 2019/0091877 A1* | 3/2019 | Park | B25J 19/02 |
| 2019/0176326 A1* | 6/2019 | Bingham | B25J 9/161 |
| 2019/0381654 A1 | 12/2019 | Oleynik | |
| 2020/0017317 A1* | 1/2020 | Yap | B65G 1/1376 |
| 2020/0030970 A1* | 1/2020 | Mariyama | B25J 9/1697 |
| 2020/0030971 A1 | 1/2020 | Oleynik | |
| 2020/0095001 A1* | 3/2020 | Menon | B25J 9/1687 |
| 2021/0001481 A1* | 1/2021 | Hayashi | B25J 9/1664 |
| 2021/0094174 A1* | 4/2021 | Romeres | B25J 9/163 |
| 2021/0107157 A1* | 4/2021 | Bai | B25J 9/1692 |
| 2021/0187737 A1* | 6/2021 | Fujimoto | B25J 9/1661 |
| 2021/0252714 A1* | 8/2021 | Hayashi | B25J 13/00 |

FOREIGN PATENT DOCUMENTS

| | | | | |
|---|---|---|---|---|
| JP | 2000-42962 A | 2/2000 | | |
| JP | 2015-83324 A | 4/2015 | | |
| KR | 10-2016-0124770 A | 10/2016 | | |
| KR | 10-1688867 B | 12/2016 | | |
| KR | 10-2019-0102250 A | 9/2019 | | |
| TW | I464046 B | 12/2014 | | |
| TW | 201830184 A | 8/2018 | | |
| WO | WO-2020075423 A1 * | 4/2020 | ............ | B25J 19/023 |

OTHER PUBLICATIONS

Takahashi Kuniyuki et al, "Effective motion learning for a flexible-joint robot using motor babbling", 2015 IEEE/RSJ International Conference on Intelligent Robots and Systems (IROS), Sep. 28, 2015, pp. 2723-2728, IEEE, Hamburg, Germany; Cited in EESR issued on Sep. 23, 2021.

Extended European Search report ("EESR") dated Sep. 23, 2021 in counterpart European Application.

Office Action dated May 2, 2023 in counterpart Taiwanese Application.

Communication pursuant to Article 94(3) EPC dated May 31, 2023 in a counterpart European patent application.

Gorinevsky et al., "Force Control of Robotics Systems", CRC Press LCC, issued on Dec. 31, 1997, p. 200-219, 283-305, XP002778660, ISBN: 978-0-8493-2671-4; Relevance is indicated in the Communication dated May 31, 2023 in a counterpart European patent application.

* cited by examiner

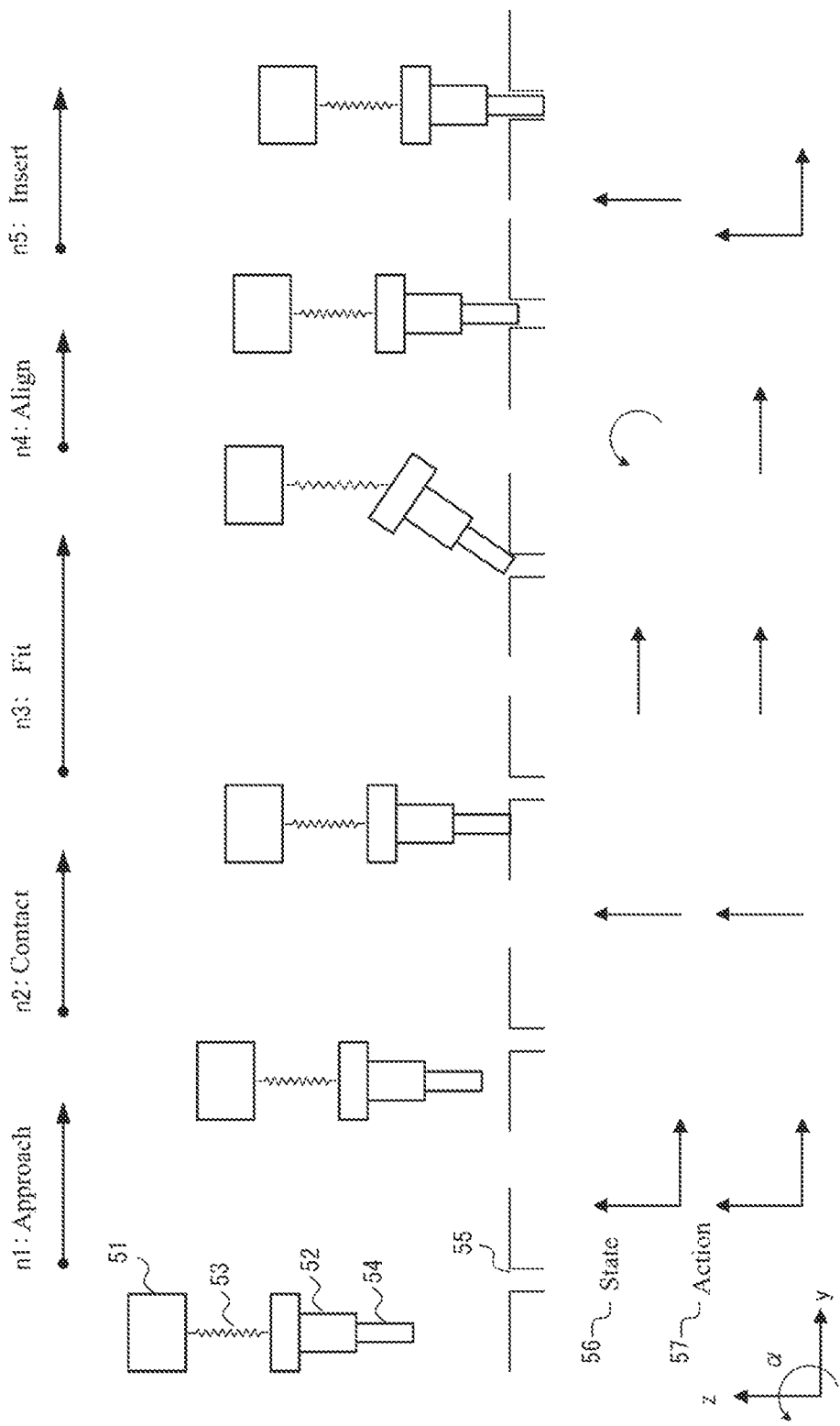

FIG. 6

Position control (Prior design) → Speed control (Machine learning) →

| MP | n1: Approach | n2: Contact | n3: Fit | n4: Align | n5: Insert |
|---|---|---|---|---|---|
| Condition | Move from initial position to vicinity of hole | Make contact with surface near hole | Fit leading end of peg into hole | Correct orientation of peg so as to be parallel to hole | Insert peg until bottom of hole is reached |
| State space | — | — | $x_{fit} = [y, \dot{y}]^T$ | $x_{align} = [\alpha, \dot{\alpha}]^T$ | $x_{insertion} = [z, \dot{z}]^T$ |
| Action space | — | — | $u_{fit} = \dot{y}_d$ | $u_{align} = \dot{y}_d$ | $u_{insertion} = [\dot{y}_d, \dot{z}_d]^T$ | ns
CONTROL APPARATUS, ROBOT, LEARNING APPARATUS, ROBOT SYSTEM, AND METHOD

CROSS-REFERENCES TO RELATED APPLICATIONS

This application claims priority to Japanese Patent Application No. 2020-044422 filed Mar. 13, 2020, the entire contents of which are incorporated herein by reference.

FIELD

The disclosure relates to control of and learning of control of a robot provided with a flexible portion.

BACKGROUND

When considering operations such as those of product assembly performed in a factory, contact operations such as fitting with little clearance are essential. There is strong demand to realize such operations in the same time or less than it would take a person to perform the operations. To realize such operations, conventionally the following approaches were considered.

A first conventional method uses a high precision machine and a mechanism (a jig, a dedicated hand, etc.) for reducing uncertainty in position and orientation. However, if the assembly involves multiple parts, the positioning method and the jig need to be contrived for each of the individual targets when assembly involves multiple parts and the jig need to be contrived, thus making such a method extremely weak to design changes.

A second conventional method estimated the position and orientation of a target using a depth sensor or the like. However, in such a method it is difficult to make sufficiently accurate estimations for certain applications. For example, when assembling small parts, sub mm accuracy is required, but sufficient accuracy is currently not obtainable. Furthermore, there is also uncertainty in how a target is held when gripped and calibration errors occur between a robot and a camera, and even if sub mm recognition accuracy was obtainable, there is no guarantee that assembly work would be successful. Visual feedback that is based on the position of an object or robot recognized using a visual sensor provides solutions to a certain extent, but a high-speed feedback cycle is required and visual recognition becomes difficult once fitting is started, and thus it cannot be determined whether the right amount of force is applied.

A third conventional method controls the application of a force using force control (For example, see JP 2000-042962). While the application of a force can be controlled with such a method, an operation strategy needs to be elaborated for each target. Also, a force cannot be controlled without high-speed control, and thus the control cycle needs to be shortened, which involves an increase in cost.

A fourth conventional method uses a passive operation mechanism that can absorb an error (For example, see JP 2015-083324). Minute errors can be absorbed by using a passive movable element such as a compliance unit. However, high accuracy to the extent where errors can be brought into an absorbable range is required. For example, when a robot provided with an arm including a passive movable element presses an object gripped thereby into a hole guided by a chamfered portion of the hole, sufficient accuracy for bringing the object into contact with the chamfered portion is required. Furthermore, the operations need to be elaborated by a person, and thus setting requires time and a skilled person.

JP 2000-042962A and JP 2015-083324A are examples of related art.

SUMMARY

A control apparatus according to one or more embodiments may make it easy to have a robot perform high-speed operations involving contact.

In order to achieve the above-described, the following configurations may be employed.

A control apparatus of a robot according to one or more embodiments may include: a state obtaining unit configured to obtain state observation data comprising flexible related observation data, which is observation data regarding a state of at least one of a flexible portion, a portion of the robot on a side where an object is gripped relative to the flexible portion, and a gripped object, wherein the robot includes: a gripper configured to grip an object, an arm configured to move the gripper, and a physically flexible portion provided at least one of an intermediate position of the gripper, a position between the gripper and the arm, and an intermediate position of the arm; and a controller configured to control the robot so as to output an action to be performed by the robot to perform predetermined work on the object, in response to receiving the state observation data, based on output obtained as a result of inputting the state observation data obtained by the state obtaining unit to a learning model, the learning model being learned in advance through machine learning and included in the controller.

The "physically flexible portion" may be a concept including a mechanism realized by a passive element in which a restoring force acts against displacement, and may typically include an elastic body such as a spring or a piece of rubber, a damper, a pneumatic or hydraulic cylinder. Mechanisms where flexibility may be obtained by using force control or only through force control may be excluded from the "physically flexible portion".

The learning model may use current state observation data as input and outputs the appropriate action of the next step to complete predetermined work. The learning model may also be called a control model, a control policy, or the like. The learning model may be acquired through any sort of machine learning algorithm, for example, the learning model can be obtained through reinforcement learning. When considering data throughput, it may be preferable to employ model-based reinforcement learning, but model free reinforcement learning may also be employed. Also, the learning model may be acquired through deep learning, supervised learning, and semi-supervised learning.

In one or more embodiments, the predetermined work may include a plurality of motion primitives, and the controller may include a plurality of learning models corresponding to the plurality of motion primitives. The motion primitives are also called operation sections, MPs, or the like. Each of the motion primitives may be an operation with a defined goal, and unique restrictions may be applied to state focused-on variables and actions to be performed.

In one or more embodiments, the plurality of motion primitives may include at least one or more constraining motion primitives that control the robot so as to perform an action while maintaining a constrained state where the gripper or the object gripped by the gripper is brought into contact with or is near its environment. Also, the learning model corresponding to the constrained motion primitive may be learned through learning processing in which a state space and an action space are subjected to dimension reduction.

In one or more embodiments, the learning model may output actions, for an entire operation not divided into a plurality of motion primitives or for one motion primitive, including an action such that an operation is performed while maintaining a constrained state where the gripper or the object gripped by the gripper is in contact with or near the environment. The learning model regarding control of the robot while maintaining the constrained state may be learned through learning processing in which a state space and an action space are subjected to dimension reduction.

The flexible portion according to one or more embodiments may be provided between the gripper and the arm, and the flexible related observation data may include at least one of: force-related sensing data related to a force taken on by the gripper from the object; at least one of a position, speed, orientation, and angular velocity of a change in orientation of the gripper; at least one of a relative distance and a relative angle between the gripper and the arm; force-related sensing data related to a force taken on by the flexible portion; and data that is based on a captured image of at least one of the object, the gripper, and the flexible portion.

A robot system according to one or more embodiments may include: a robot that is provided with a gripper configured to grip an object and an arm configured to move the gripper, and includes a physically flexible portion provided at least one of an intermediate position of the gripper, a position between the gripper and the arm, and an intermediate position of the arm; and the control apparatus according to one or more embodiments.

A robot according to one or more embodiments may include: a gripper configured to grip an object; an arm configured to move the gripper; a physically flexible portion provided at least one of an intermediate position of the gripper, a position between the gripper and the arm, and an intermediate position of the arm; and a sensor configured to detect a state of at least one of the flexible portion, a portion of the robot on a side where the object is gripped relative to the flexible portion, and a gripped object.

A learning apparatus according to one or more embodiments may include: a state obtaining unit configured to obtain flexible related observation data including state observation data, which is observation data regarding a state of at least one of a flexible portion of a robot, a portion of the robot on a side where an object is gripped relative to the flexible portion, and the gripped object, the robot being provided with a gripper configured to grip the object, an arm configured to move the gripper, and including the physically flexible portion provided at least one of an intermediate position of the gripper, a position between the gripper and the arm, and an intermediate position of the arm; and a learning unit configured to, upon receiving the state observation data, acquire a learning model configured to output an action to be performed by the robot to perform predetermined work on the object.

one or more embodiments may be comprehended as a control method for controlling a robot and also as a learning method for acquiring a learning model that outputs actions to be taken by a robot. Also, one or more embodiments also be comprehended as a program for realizing the method and a recording medium in which the program is non-temporarily recorded. Note that one or more embodiments may be configured by combining, as much as possible, each of the above units and processes.

According to one or more embodiments, a robot may be made to perform high-speed operations involving contact with ease.

BRIEF DESCRIPTION OF THE DRAWINGS

FIG. 5 is a diagram illustrating motion primitives (MP) that constitute fitting work of a peg.

FIG. 6 is a diagram illustrating motion primitives (MP) that constitute fitting work of a peg.

DETAILED DESCRIPTION

Application Examples

Figure 1:
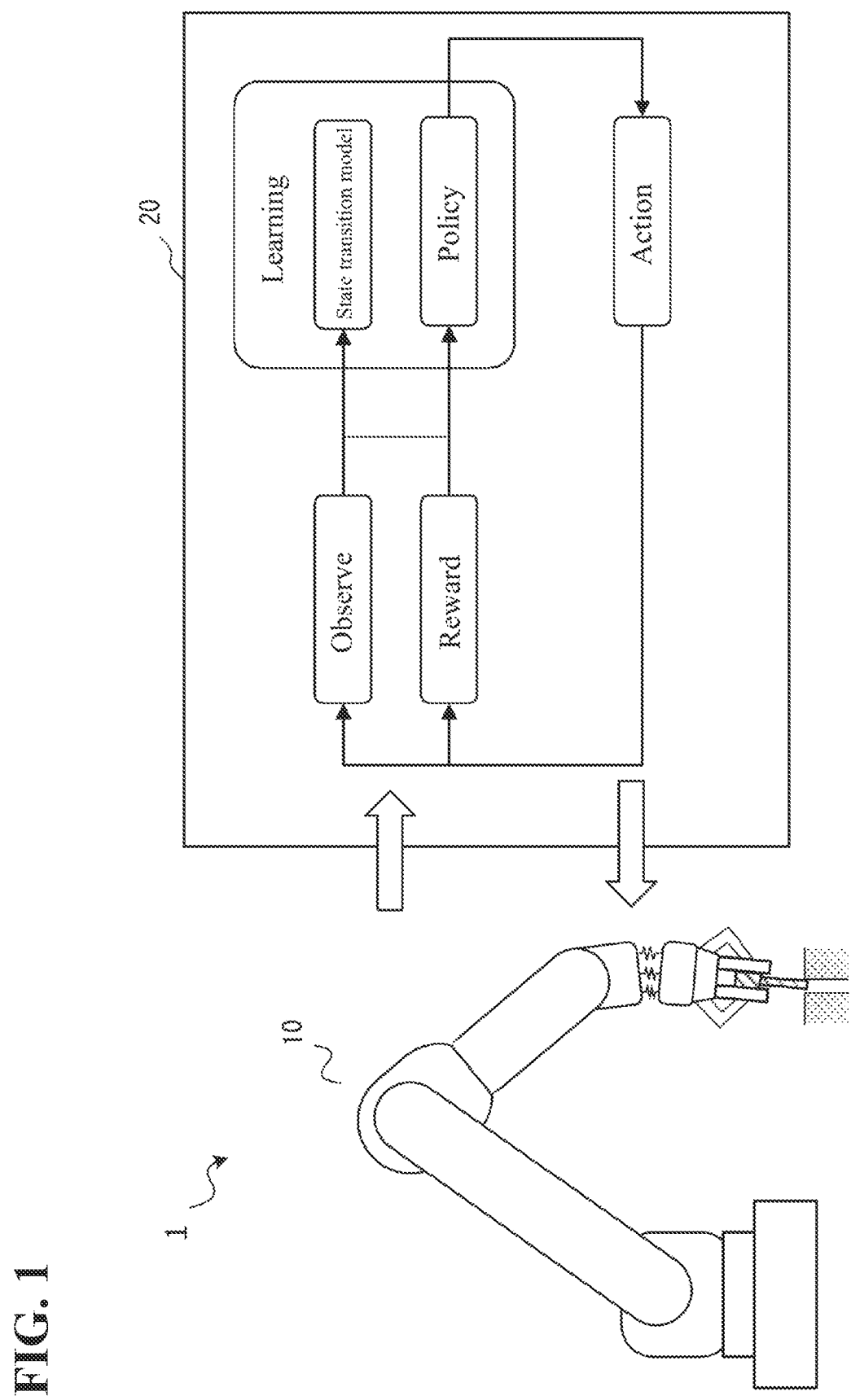
FIG. 1 is a diagram illustrating the outline of a robot system (learning phase) according to one or more embodiments.

An application example of a robot system 1 according to one or more embodiments is described with reference to FIG. 1. The robot system 1 uses machine learning (model-based reinforcement learning or the like) to acquire a model for controlling a robot 10 provided with a flexible portion. Because the robot 10 has a flexible portion, a gripped part is safe even if it is brought into contact with its environment, and fitting work and the like can be realized even if the control cycle is slow. On the other hand, the positions of a gripper and a part remain uncertain due to the flexible portion, and thus an analytic control model is difficult to obtain. Thus, in one or more embodiments, a control model may be acquired using machine learning.

Simply performing machine learning of a control model requires that a very large amount of data be collected, and the learning takes time. Thus, in the robot system 1, learning in which state space and action space are subjected to dimension reduction is performed in consideration of constraint conditions according to the flexibility of the robot and contact between the robot and its environment. For example, in learning of an operation to fit a peg into a hole, the entire operation is divided into segments (Motion Primitives (MP)), and only state variables of a dimension with degrees of freedom in MPs, in which a state of contact is entered, are focused on. Also, because the robot is provided with the flexible portion, force control is not required for dimensions with reduced degrees of freedom due to contact, and thus it is sufficient to only control position and speed, and learning is performed such that only an action is taken in a dimension reduced action space in which the degrees of freedom have further decreased due to contact. Accordingly, fast learning can be realized by subjecting the state space and action space to dimension reduction.

Instead of performing an operation while maintaining a state where a gripped part is in contact with its environment, an operation may be performed while maintaining a state where the gripped part is near the environment. Here, "near" means that there is a minute interval, for example, of several millimeters between a part and its environment. The size of the interval is measured or estimated by a sensor such as a proximity sensor that is based on static capacitance or electromagnetic induction, an optical displacement sensor, and a visual sensor. The state of being near may be maintained through position control without measuring the size of the interval. The interval may fluctuate from a target value due to the influence of an external force, movement by the robot, or the like. While the near state is being maintained, the part may temporarily come into contact with its environment. In the case of contact occurring, shock absorption by the flexible portion takes place. The following description of performing operations while maintaining a state of contact can be replaced with a case in which operations are performed while maintaining a near state, as long as maintaining a near state is technically possible.

To observe the state of the robot 10, for example, encoders of the joints of the robot 10, a visual sensor (camera), motion capture, and a force-related sensor can be used. The position and orientation of the arm leading end can be specified from the angle of each joint, and the orientation of a part (work object) can be estimated from a visual sensor and/or a force-related sensor. In the case where a marker for motion capture is attached to a gripper, the position and orientation of the gripper can be specified, and the orientation of the part (work object) can be estimated based on the position and orientation of the gripper.

"Force-related sensor" is the collective term for force sensors and torque sensors, and also includes tactile sensors when a sensor is provided at a portion that comes in contact with a part. Force-related sensors may be provided on a surface of a portion of a gripper where a part is gripped or at a joint portion in a gripper, so as to detect a force taken on by the gripper of the robot from the part. When the flexible portion is provided between the gripper and the arm, a force-related sensor may be provided between the gripper and the arm and detect a force acting between the gripper and the arm. The force-related sensor is, for example, a single element or multiple element, one axis, three axis, or six axis sensor that detects a force. Using a force-related sensor makes it possible to grasp how the gripper is gripping the part, that is, the orientation of the part can be more accurately grasped, and suitable control can be performed. Data obtained by a force-related sensor is called "force-related sensing data" in the present disclosure.

Also, the position and orientation of the gripper itself and the part gripped by the gripper can also be detected by using a visual sensor. If a flexible portion is provided between the gripper and the arm, the position and orientation of the gripper relative to the arm can also be specified by using a displacement sensor that detects displacement of the gripper relative to the arm.

Accordingly, the state of at least one of the flexible portion, a portion of the robot on a side where the object is gripped relative to the flexible portion, and the gripped part can be detected by using various sensors. The detection results of the sensors can be obtained as state observation data. Note that observation data regarding the flexible portion, the portion of the robot on the side where the object is gripped relative to the flexible portion, and the gripped part may also be referred to as "flexible related observation data" in the present disclosure. The state observation data may only be flexible related observation data, or may also include observation data regarding another state excluding those described above, in addition to the flexible related observation data.

A learning apparatus 20 acquires a learning model for the robot 10 through machine learning. While it is particularly favorable to employ, as the learning algorithm, reinforcement learning in which learning is performed through trial-and-error using machine learning without teaching data, a learning model may also be acquired using supervised learning. If reinforcement learning is employed, it is particularly favorable to use model-based machine learning with high data throughput, but model free reinforcement learning may also be used. Further, if reinforcement learning is employed, in an initial learning stage, learning may be performed using the results of a person moving the arm and gripper of the robot 10. In random control at the initial stage of learning, there are cases where learning takes time without any reward being acquired, but the learning time can be shortened by manually moving the arm and gripper. The learning apparatus 20 may also acquire a learning model through deep learning.

The learning model (learned model) acquired by the learning apparatus 20 is installed to a control apparatus that controls the robot 10 and is used in actual work. The control apparatus may include a learning function, and additional learning may be performed if a learning function is included.

According to the present application example, the robot 10 has the flexible portion, and thus operations can be performed with ease without performing complex force control, while the gripper or the object is in contact with its environment. Also, high-speed work can be performed because the gripper or object can be brought into contact with its environment without much of a reduction in speed. Further, a system can be easily constructed because a learning model is acquired through machine learning.

Also, when machine learning is performed, by subjecting the state space and action space to dimension reduction based on constraint conditions, or reducing dimensions of sensor data, the amount of data can be reduced and high-speed learning (acquirement of a learning model) can be realized. Because a learning model acquired by performing learning according to the work can be acquired in a few steps, many types of work and not just a specific type of work can be performed with ease.

In a case where state space is subjected to dimension reduction, it is sufficient to only use the state observation data detected by a sensor or sensors corresponding to the reduced dimensions. In the case where the state observation data is data including components of a plurality of dimensions, the components of the dimensions remaining after subjecting the original state observation data to dimension reduction may be extracted and used. Alternatively, it is possible to perform analysis and dimension compression on the state observation data at the learning stage, and reduce the dimensions of the state observation data corresponding to the dimensions to which motion has been consequently constrained. For the method of analysis for dimension compression, principal component analysis, an auto encoder, sparse coding, deep learning, and the like can be used. According to the reduced dimensions in the state space, the action space may also be subjected to dimension reduction.

First Embodiment

FIG. 1 is a diagram illustrating a robot system according to one or more embodiments. FIG. 1 shows a configuration used in a learning phase of a learning model for controlling the robot system. In the learning phase, a robot system 1 includes a robot and a learning apparatus 20.

Robot

Figure 2A:
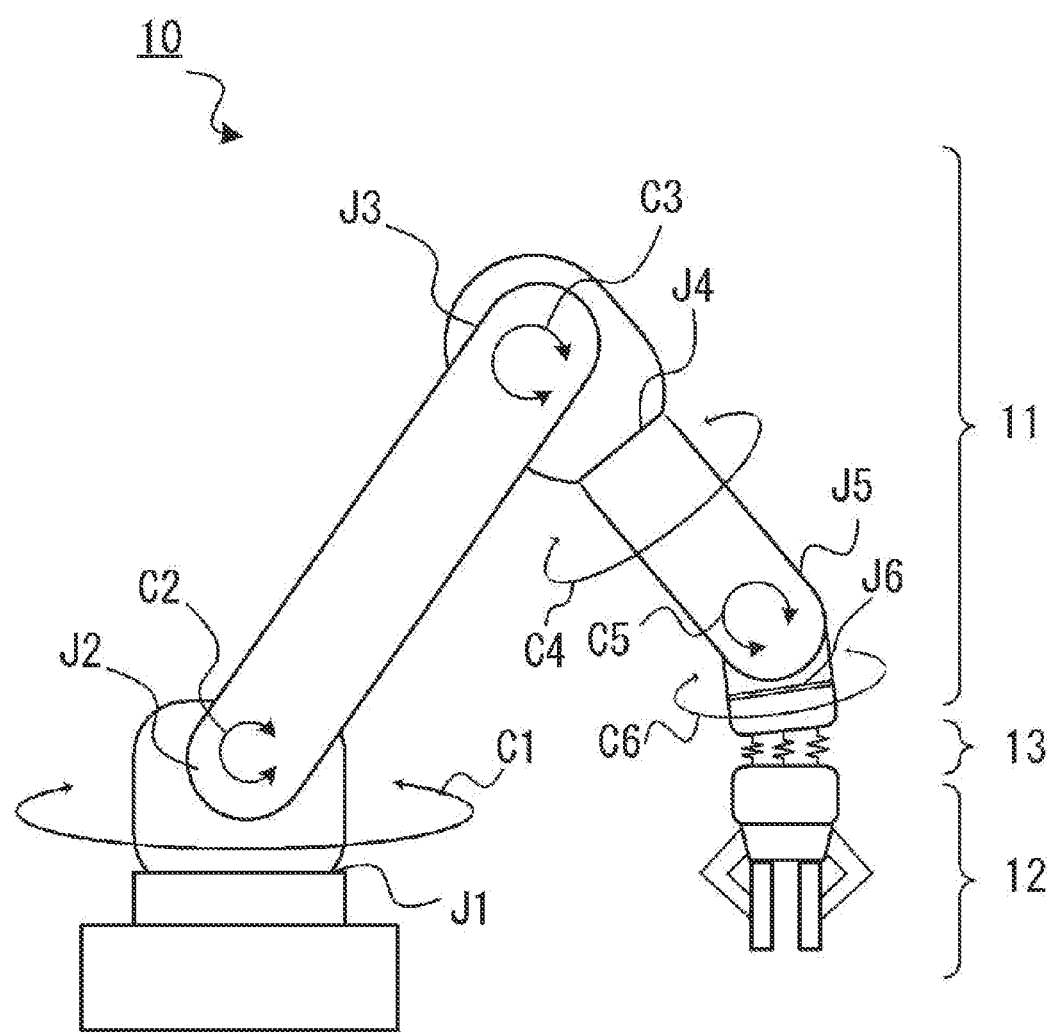
FIGS. 2A and 2B are diagrams illustrating an outline of a configuration of a robot.
Figure 2B:
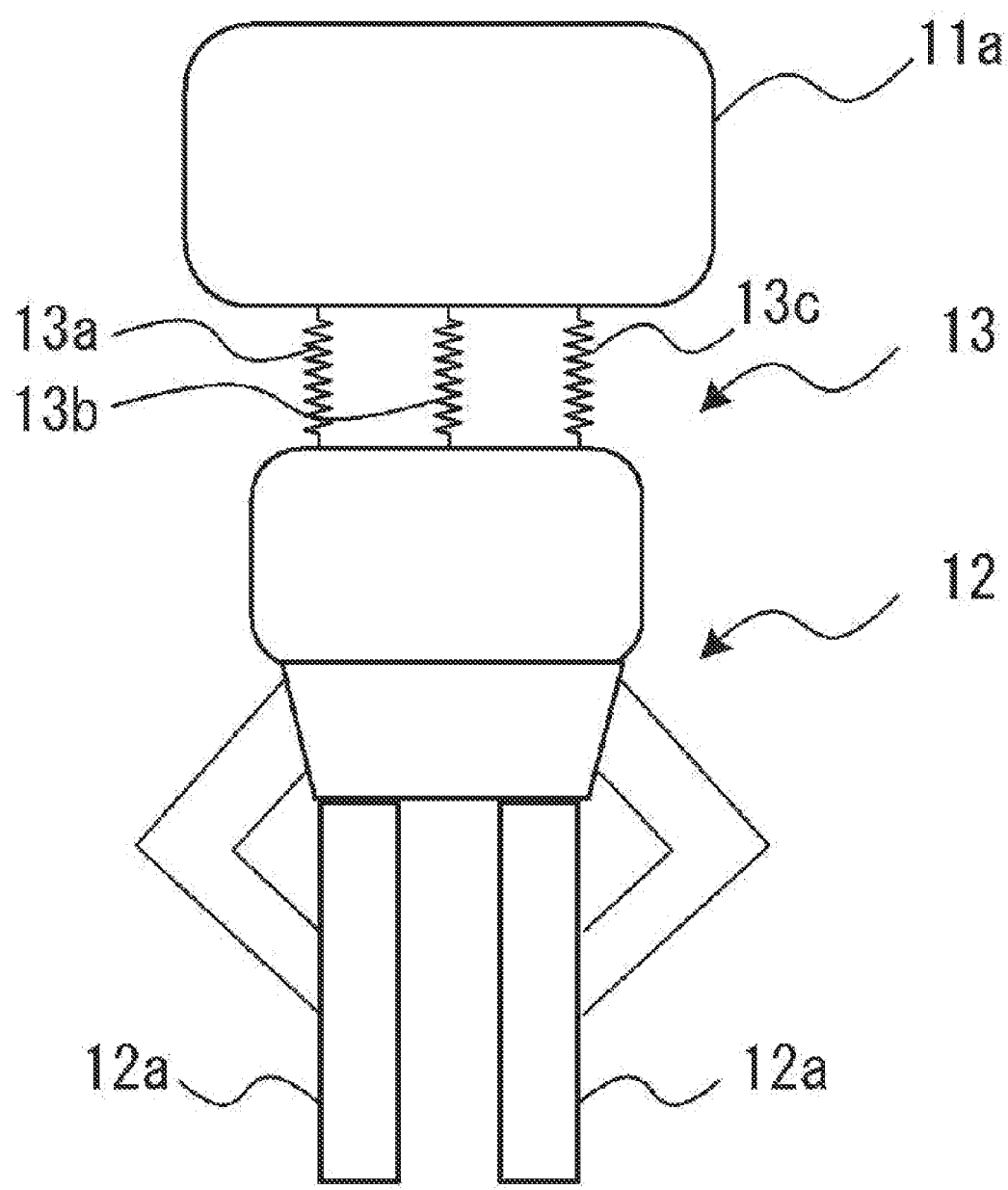

FIGS. 2A and 2B are diagrams illustrating an outline of the configuration of the robot 10. The robot 10 according to the illustrated embodiment is a six axis, vertically articulated robot, and is provided with a gripper (hand) 12 at the leading end of an arm 11 interposed by a flexible portion 13. The robot 10 performs fitting work which involves fitting a part (a peg, etc.) gripped by the gripper 12 into a hole.

As shown in FIG. 2A, the robot 10 includes the arm 11 provided with joints J1 to J6, the arm 11 having six degrees of freedom. The joints J1 to J6 are connected so that joined links can be rotated, by an un-shown motor, in the directions of arrows C1 to C6. Here, a vertically articulated robot is used as an example, but a horizontally articulated robot (SCARA robot) may also be used. Also, a six axis robot is used as an example, but another articulated robot with other degrees of freedom such as a five axis or seven axis robot may be used, and a parallel link robot may also be used.

The gripper 12 includes one set of clamping portions 12a and controls the clamping portions 12a to clamp a part. The gripper 12 is connected to a leading end 11a of the arm 11 via the flexible portion 13, and moves as the arm 11 moves. In one or more embodiments, the flexible portion 13 is constituted by three springs 13a to 13c arranged in a positional relationship where the base portion of each spring is located at a vertex of an equilateral triangle, but there is no limit on the number of springs. Also, the flexible portion 13 may be another mechanism as long as it is one that generates a restoring force that acts against fluctuations in position to obtain flexibility. For example, the flexible portion 13 may be an elastic body such as a spring or a piece of rubber, a damper, a pneumatic or hydraulic cylinder, or the like. The flexible portion 13 is preferably constituted by passive elements, and mechanisms where flexibility is obtained through force control are excluded. The arm leading end 11a and the gripper 12 are configured to be relatively moveable in the horizontal and vertical direction by 5 mm or more, preferably 1 cm or more, and more preferably 2 cm or more, due to the flexible portion 13.

A mechanism that switches the gripper 12 and the arm 11 between a flexible state and a fixed state may also be provided.

Here, a configuration where the flexible portion 13 is provided between the leading end 11a of the arm 11 and the gripper 12 is described as an example, but the flexible portion 13 may be provided at an intermediate position of the gripper 12 (for example, a finger joint or an intermediate position of a columnar portion of a finger), or an intermediate position of the arm 11 (any one of the joints J1 to J6 or an intermediate position of a columnar portion of the arm). Also, the flexible portion 13 may be provided at a plurality of the above described positions.

Learning Apparatus

Next, the learning apparatus 20 will be described.

Figure 3:
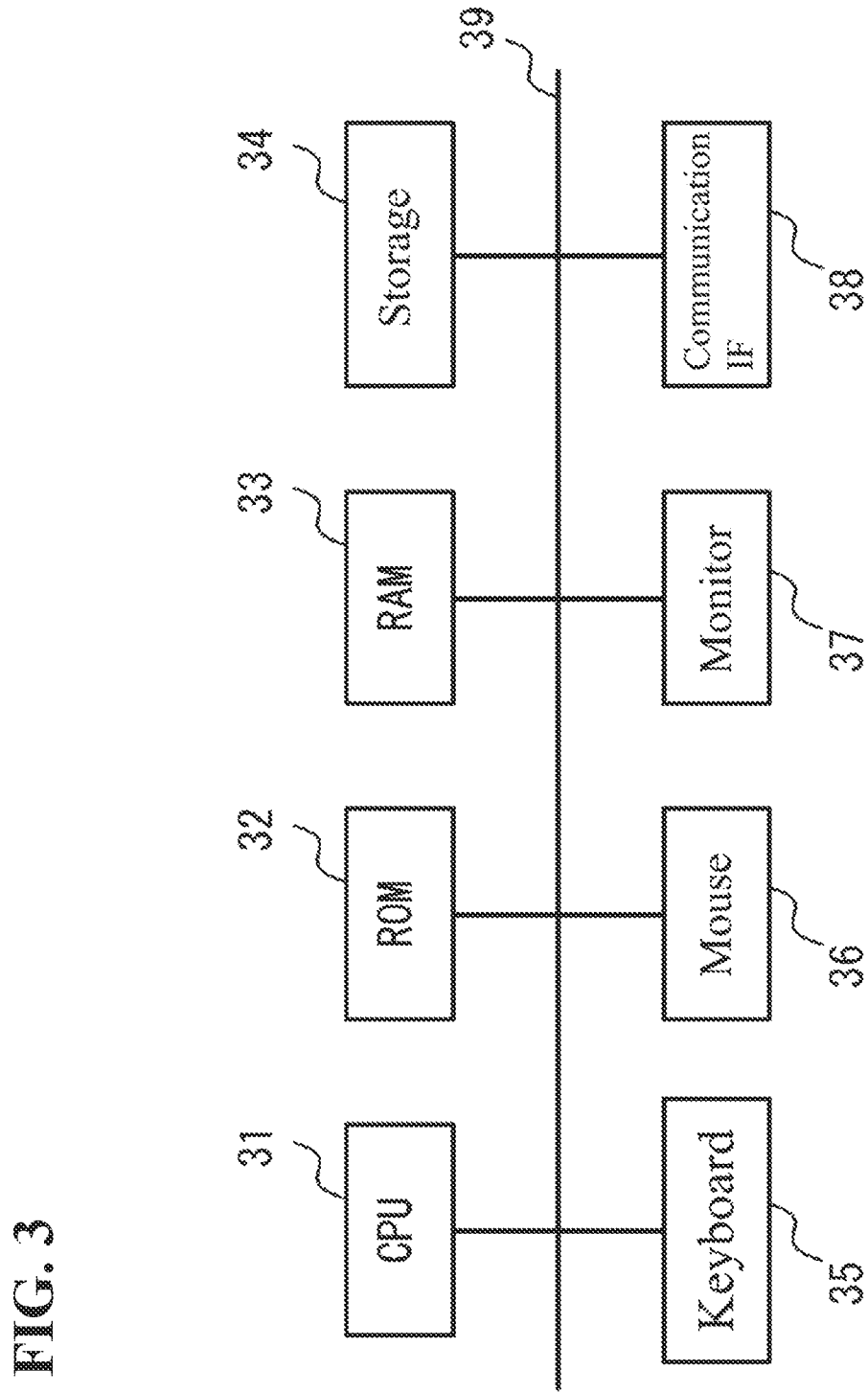
FIG. 3 is a block diagram illustrating a hardware configuration of a learning apparatus that acquires a control system of a robot.

FIG. 3 is a block diagram showing a hardware configuration of a learning apparatus according to one or more embodiments. As shown in FIG. 3, the learning apparatus 20 has a similar configuration to that of an ordinary computer (information processing apparatus), and includes a CPU (Central Processing Unit) 31, a ROM (Read Only Memory) 32, a RAM (Random Access Memory) 33, storage 34, a keyboard 35, a mouse 36, a monitor 37, and a communication interface 38. The constituent elements are communicably connected to each other via a bus 39.

In one or more embodiments, a learning program for executing learning processing of a learning model is stored in the ROM 32 or the storage 34. The CPU 31 is a central processing unit and executes various types of programs and controls the constituent elements. That is, the CPU 31 reads a program from the ROM 32 or the storage 34, and executes the program using the RAM 33 as a work area. The CPU 31 controls the constituent elements and performs various types of arithmetic processing according to a program recorded in the ROM 32 or the storage 34. The ROM 32 stores various types of programs and data. The RAM 33 acts as a work area where programs or data is temporarily stored. The storage 34 is configured by an HDD (Hard Disk Drive), an SSD (Solid State Drive), or a flash memory, and stores various types of programs including an operating system, and various types of data. The keyboard 35 and the mouse 36 are examples of an input apparatus, and are used to make various types of input. The monitor 37 is, for example, a liquid crystal display, and displays a user interface. The monitor 37 may be of a touch-panel type and function as an input unit. The communication interface 38 is an interface for communicating with another device, and, for example, employs a standard such as Ethernet (registered trademark), FDDI, or Wi-Fi (registered trademark).

Next, the functional configurations of the learning apparatus 20 will be described.

Figure 4:
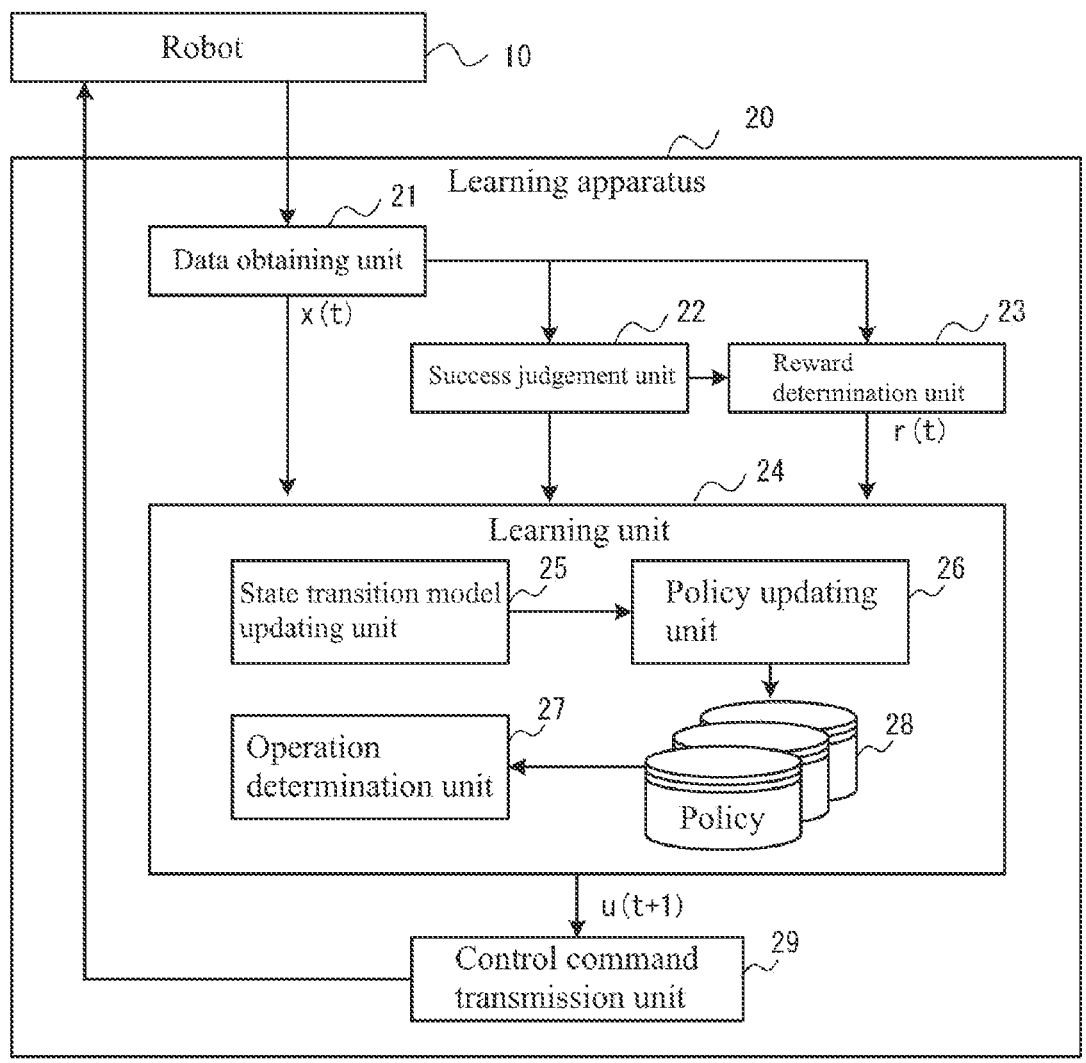
FIG. 4 is a block diagram illustrating a functional configuration of a learning apparatus that acquires a control system of a robot.

FIG. 4 is a block diagram showing an example of the functional configurations of the learning apparatus. As shown in FIG. 4, the learning apparatus 20 includes, as functional configurations, a data obtaining unit 21, a success judgement unit 22, a reward determination unit 23, a learning unit 24, and a control command transmission unit 29. Each functional configuration is realized by the CPU 31 reading out a learning program stored in the ROM 32 or the storage 34, and loading to and executing the program in the RAM 33. Note that, at least one or all of the functions may be realized by a dedicated hardware apparatus.

The data obtaining unit 21 obtains data indicating the state of the robot 10. Here, the data to be obtained is called "state observation data". State observation data may include data with which the position and orientation of the gripper 12 or a part gripped by the gripper 12 can be specified. While described in detail below, the data obtaining unit 21 obtains state observation data from, for example, a joint encoder, a visual sensor (camera), motion capture, a force-related sensor (force sensor, torque sensor, and tactile sensor), and a displacement sensor.

The success judgement unit 22 judges whether or not operations performed by the robot 10 meet a predetermined success condition. As described below, in one or more embodiments, one kind of work (skill) such as peg fitting work is learned by being divided into a plurality of motion primitives (MP). The success judgement unit 22 judges whether or not the success condition defined for each MP has been met. Examples of a success condition include, for example, a peg being located in the vicinity of a hole (non-contact), a peg being in contact with a surface near a hole, the leading end of a peg entering a hole, a peg entering a hole and being parallel with the hole, and a peg being completely fitted into a hole. The success judgement unit 22 may make a judgement based on state observation data or based on data different from state observation data.

The reward determination unit 23 determines a reward r(t) relative to an action u(t) in a state x(t). For example, the reward determination unit 23 only gives a positive reward when success has been judged by the success judgement unit 22 and otherwise gives no reward. The reward determination unit 23 may be set so that a positive reward is given when a state is close to one that meets a success condition, and a negative reward is given when a state is far from one where a success condition is met.

The learning unit 24 learns a policy 28 (learning model) for controlling the robot 10. When state observation data regarding the robot 10 is input, the learning unit 24 outputs the appropriate action of the next step to perform predetermined work, based on the policy 28.

The learning unit 24 of one or more embodiments uses model-based reinforcement learning to acquire the policy 28. That is, a state transition model updating unit 25 of the learning unit 24 learns a state transition model of the robot 10, and a policy updating unit 26 of the learning unit 24 uses the learned state transmission model to learn the policy 28 of the robot 10. The state transition model receives input of the state x(t) and the action u(t) at the time of the state x(t) and outputs a post-action state x(t+1). The policy 28 is a model that receives input of the state x(t) and outputs an action u(t) that is to be taken. The policy updating portion 26 learns the policy 28 so as to maximize a cumulative expected reward. An operation determination unit 27 (agent) executes the policy 28 to output an action u(t).

The control command transmission unit 29 generates and transmits commands to the robot 10 based on the action u(t) output according to the policy 28 being learned.

Types of State Observation Data

Here, state observation data that may be used in one or more embodiments will be described. Examples of state observation data include data regarding tactile distribution (e.g., pressure distribution) of a portion of the gripper 12 in contact with an object, a force measured by a force sensor provided in the clamping portions 12a of the gripper 12, an angle and angular velocity of each joint obtained from encoders in the joints of the robot 10, torque acting on a joint of the robot 10, an image obtained by a visual sensor attached to the arm of the robot 10, a force acting on the flexible portion 13 of the robot 10 measured by a force sensor, relative displacement between portions sandwiching the flexible portion 13 measured by a displacement sensor provided in the flexible portion 13, and a position and orientation of the gripper 12 measured through motion capture.

The position, orientation (angle), speed, and angular velocity in changes in orientation of the arm leading end 11a can be obtained from data from a joint encoder. Note that, if the position and orientation (angle) can be obtained at each timing, the time variation (speed, angular velocity) thereof can be obtained, and thus there may be no mention of time variation being obtainable below. The position and orientation of the gripper 12 and the gripping target object relative to the arm 11 can be obtained from data from a visual sensor. The position and orientation of the gripper 12 relative to the arm 11 or the position and orientation of the gripping target object relative to the gripper 12 can also be obtained from data from a force-related sensor.

Also, if a marker for motion capture is attached to the gripper 12, the position and orientation of the gripper 12 can be obtained using only the motion capture data. The position and orientation of a gripping target object relative to the arm may be obtained using a visual sensor or a force-related sensor. Further, if a marker is also attached to the gripping target object, the position and orientation of the gripping target object can also be obtained.

For the sake of simplicity in the following description, state variables (state observation data) may be described as being the position and speed of a gripper or gripping target object, in a cartesian coordinate system. However, the state variables may be expressed as one of the types of above-described data or a combination thereof.

Motion Primitive (MP) and Dimension Reduction

Motion primitives will be described. The peg fitting work learned in one or more embodiments is divided into operation sections, and a control model is learned for each of the sections. Each of these operation sections is a motion primitive. Motion primitives are also called MPs.

MPs constituting the peg fitting work in one or more embodiments will be described with reference to FIGS. 5 and 6. In FIG. 5, 51 indicates an arm leading end, 52 indicates a gripper, 53 indicates a flexible portion, 54 indicates a gripping target object (peg), and 55 indicates a hole. Reference numerals 56 and 57 shown in FIG. 5 respectively represent a state and action considered for each MP. FIG. 6 is a descriptive diagram illustrating the content of each MP and the state and action considered for each MP in more detail than shown in FIG. 5.

The overall aim of the peg fitting work is to insert the peg 54 into the hole 55. The peg fitting work is divided into the following five MPs, and a transition is made to the next MP when the error regarding the target value designated for each MP reaches or falls below a threshold.

n1: Approach
n2: Contact
n3: Fit
n4: Align
n5: Insert

[n1: Approach] is an operation of moving the gripper 52 from a suitable initial position to the vicinity of the hole 55. [n2: Contact] is an operation of bringing the peg 54 into contact with a surface in the vicinity of the hole 55. If the flexible portion 53 can be switched between a fixed mode and a flexible mode, the flexible portion 53 is switched to the flexible mode before contact is made. [n3: Fit] is an operation of moving the peg while keeping it in contact with the surface so that the leading end of the peg is fitted into the opening of the hole. [n4: Align] is an operation where the peg is moved to a horizontal orientation (vertical in the present example) relative to the hole while the leading end of the peg is fitted into and is in contact with the hole. [n5: Insert] is an operation of inserting the peg to the bottom of the hole.

In [n1: Approach] and [n2: Contact], that is, MPs in which the peg is not in contact with a surface, it is sufficient to move the peg to a target position through position control. In [n3: Fit], [n4: Align], and [n5: Insert] that is, MPs in which a state where the peg is in contact with its environment is maintained (contact motion primitives), the positions of the gripper and the peg are controlled through speed control that is based on machine learning. In machine learning for contact MPs, a policy (control model) is learned through learning processing in which state space and action space are subjected to dimension reduction.

Here, movement of the gripper and the peg will be described as being movement in an yz plane. In the [n1: Approach] MP, the yz position of the peg is input, and position control in the yz plane is performed. In the [n2: Contact] MP, the z position of the peg is input, and position control in a z direction is performed.

In the [n3: Fit] MP, a model that does not explicitly consider movement in the z direction due to the environment and the flexible portion 53 of the arm can be expressed. The state can be set to a position and speed in the y direction, and the action can be a speed command in the y direction ($x_{fit}$ and $u_{fit}$ in FIG. 6). The position of the gripper when the leading end of the peg 54 is fitted into the hole 55 is the target position.

In the [n4: Align] MP, the state is the angle and angular velocity of the gripper, and the action is a speed command in the y direction ($x_{align}$ and $u_{align}$ in FIG. 6). The flexible wrist has displaceability of six degrees of freedom (three degrees of freedom in an yz 2 dimensional plane), and thus, in a state where the leading end of the peg is in contact with the hole, rotational motion of the peg is only possible as translational motion in the y direction. The angle of the gripper when the orientation of the peg 54 is vertical is the target value.

In the [n5: Insert] MP, the state is the position and speed in the z direction, and the action is a speed command in the y and z directions ($x_{insertion}$ and $u_{insertion}$ in FIG. 6). The speed command in the y direction is made in order to avoid jamming (the peg being unable to move mid-insertion) of the peg 54. The position of the gripper when the peg 54 reaches the bottom of the hole 55 is the target position.

Learning Processing

Figure 7:
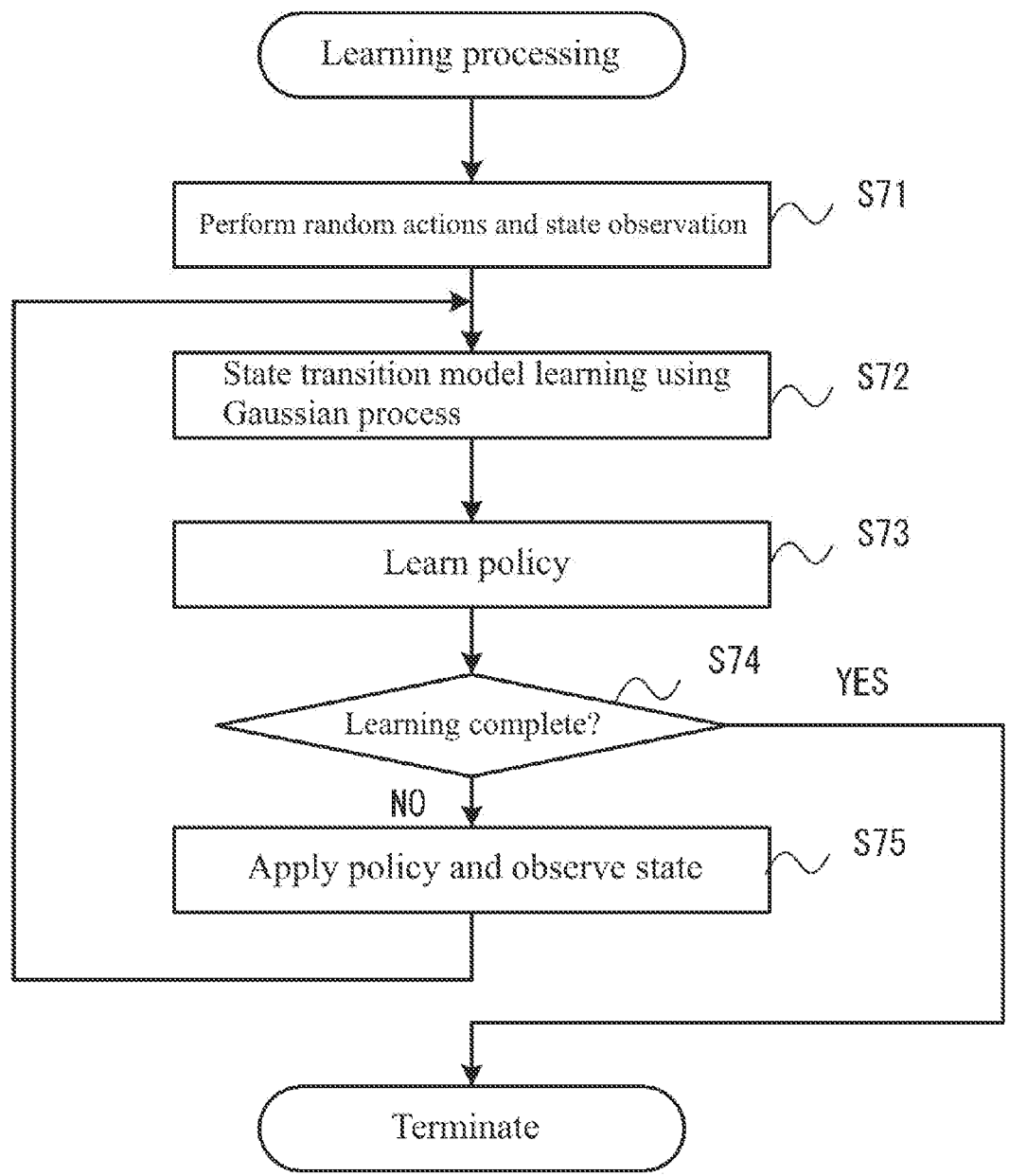
FIG. 7 is a flowchart illustrating a learning processing.

FIG. 7 is a flowchart illustrating the flow of learning processing in which machine learning is used to acquire a policy. In one or more embodiments, the policies for the three MPs [Fit], [Align], and [Insert] are acquired through the illustrated processing. The flowchart shown in FIG. 7 is learning processing performed for one MP, and the learning processing is applied to each of the MPs.

In one or more embodiments, model-based reinforcement learning (Probabilistic Inference for Learning Control, PILCO) using a Gaussian process is used. Such a learning method has a high sampling efficiency (data throughput).

In step S71, the learning apparatus 20 acquires a state transition model of the robot 10. Specifically, the control command transmission unit 29 inputs random speed control to the arm leading end, and the data obtaining unit 21 collects data including the position, speed, angle, and angular velocity of the gripper.

In step S72, the learning apparatus 20 learns a state transition model employing a Gaussian process. Specifically, the state transition model updating unit 25 updates the state transition model according to Gaussian process regression, based on the data obtained in step S71. Gaussian process regression is nonparametric regression that determines the form of functions based on data, and realizes non-linear expressions. Gaussian process regression can also express the unreliability (unreliability due to noise or lack of data) of a model through stochastic prediction. In the present method, the input of a model is a state (position, speed, angle, and angular velocity of a gripper) and an action (target speed command to arm leading end) at a timing t, and the output is the state at the following timing t+1.

In step S73, the learning apparatus 20 uses a mid-learning state transition model to learn the policy 28. A policy is a map $\pi(u|x)$ that determines the next action u to be taken in a state x. In one or more embodiments, a definitive policy according to a non-linear function (only a predicted average of the Gaussian process is used) is used. The policy is expressed by policy parameters θ (width and basis of a Gaussian kernel). The policy updating unit 26 determines the policy parameters θ that maximize the cumulative expected reward on a predetermined prediction horizon t=0, . . . , T. The cumulative expected reward is calculated by predicting, based on a model, state transitions from an initial state to a T step. In PILCO, the gradient of the cumulative expected reward can be analytically acquired, and the policy parameters θ can be acquired using a common gradient method (conjugate gradient method or L-BFGS).

In step S74, a determination is made as to whether the learning apparatus has completed learning of the policy 28. A termination condition is, for example, a pre-designated number of repetitions having been completed, and a change in the policy parameters θ being a threshold value or less. If the termination condition is not met (S74: NO), the processing proceeds to step S75. If the termination condition is met (S74: YES), learning is terminated.

In step S75, the operation determination unit 27 applies the mid-learning policy 28 and determines the next movement u(t+1), and the data obtaining unit 21 observes the resulting state. The processing returns to step S72, and learning using the thus obtained state observation data (updating of state transition model and updating of policy) is repeated.

When learning for one MP has been completed, learning is performed for the next MP. Note that, while the policy parameters θ need to be initialized for each MP, the state transition model used in the learning for the previous MP can be used as an initial model.

Thus, by using the above-described processing, a policy corresponding to a plurality of MPs can be acquired.

Note that there are cases where, if actions are taken according to a policy at the initial stage of learning, actions that lead to rewards cannot be selected and the learning does not progress. Thus, in the initial stage of learning, a model may be updated based on state observation data and actions obtained by a person manually operating the robot 10. Alternatively, a model may be updated based on state observation data obtained by a person manually operating a simulation robot simulating the robot 10, or state observation data obtained by sensing movements performed by a person using their body to perform movements. Accordingly, actions that lead to rewards can be obtained at an early stage, and learning can be performed in a shorter period of time.

Control Apparatus

Figure 8:
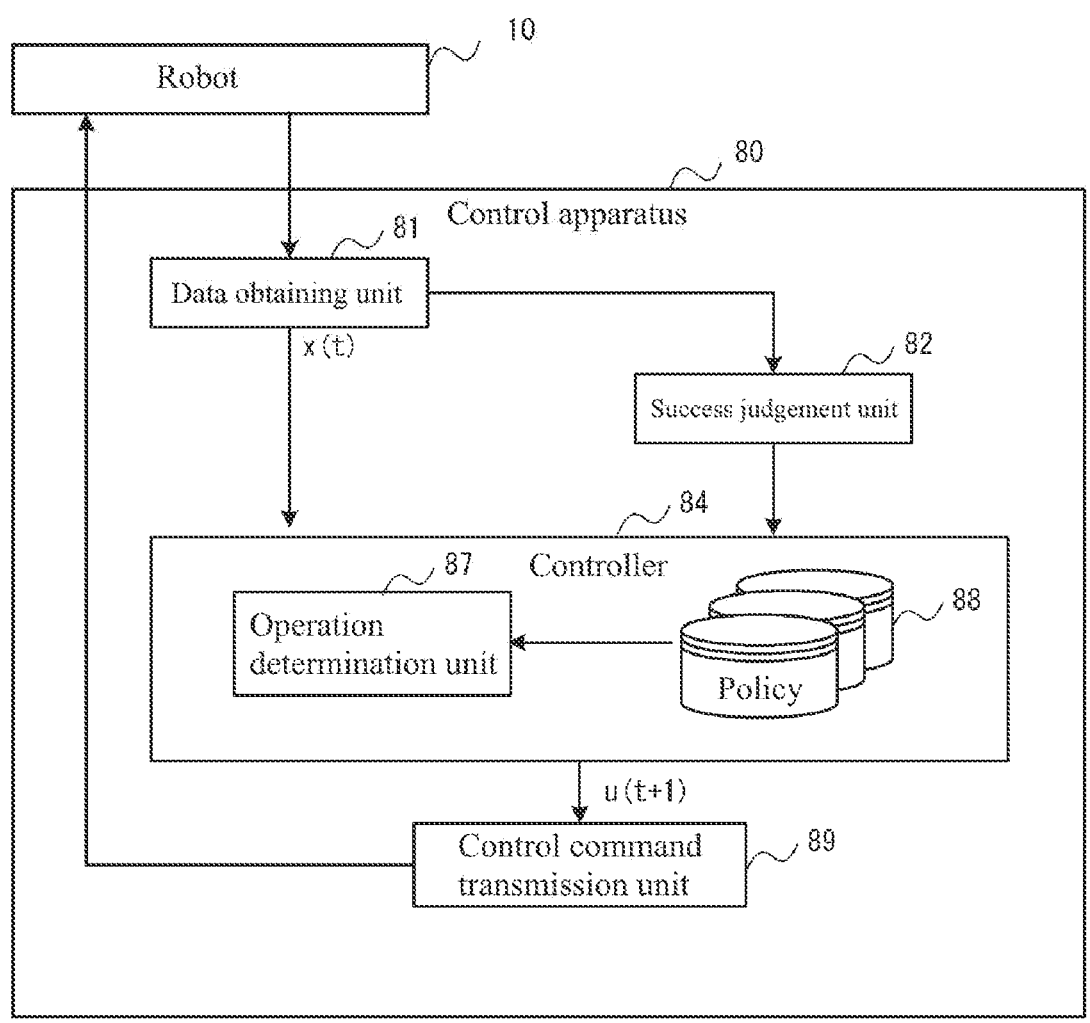
FIG. 8 is a block diagram illustrating functional configurations of a control apparatus that controls a robot.

FIG. 8 shows a configuration of the robot system 1 in a running phase. In the running phase, the robot system 1 includes the robot 10 and a control apparatus 80.

The hardware configuration of the control apparatus 80 is similar to that of the learning apparatus 20, and thus a description is not repeated. The control apparatus 80 includes, as functional configurations, a data obtaining unit 81, a success judgement unit 82, a controller 84, and a control command transmission unit 89. The controller 84 has an operation determination unit 87 and a plurality of policies (learning models) 88. The functional configurations are realized by the CPU 31 reading a learning program stored in the ROM 32 or the storage 34, and loading to and executing the learning program in the RAM 33. Note that, at least one or all of the functions may be realized by a dedicated hardware apparatus.

The data obtaining unit 81 obtains data indicating the state of the robot 10. Data obtained by the data obtaining unit 81 is similar to that obtained by the learning apparatus and thus a description is not repeated. Note that, if dimension reduction is performed on sensor data during learning, similar dimension reduction is performed during running.

The success judgement unit 82 judges whether or not an action taken by the robot meets a predetermined success condition. The success judgement unit 82, similarly to when learning is being performed, determines the success condition for each MP.

The controller 84 has the operation determination unit 87 and the policies (learning models) 88. The operation determination unit 87 determines the next action to be made by the robot 10, based on state observation data obtained by the data obtaining unit 81 and the policies 88. Note that, in [Approach] and [Contact] MPs, the controller 84 performs position control that is based on the position of the gripper 12 or the peg and the position of the hole. On the other hand, in the [Fit], [Align], and [Insert] MPs, the actions to be taken by the robot are determined according to policies acquired through machine learning.

If it is determined that the success condition(s) up to the current MP have been met by the success judgement unit 82, the controller 84 makes a switch to the policy 88 corresponding to the next MP. Specifically, if [Approach] is successful, the policy is switched to one corresponding to [Contact], if [Contact] is successful, the policy is switched to one corresponding to [Fit], if [Fit] is successful, the policy is switched to one corresponding to [Align], and if [Align] is successful, the policy is switched to one corresponding to [Insert]. If [Insert] is successful, the peg fitting work is judged as being complete.

The control command transmission unit 89 generates and transmits commands to the robot 10 based on actions output according to the policies 88.

Note that, in cases where the termination conditions for each MP are not met within a predetermined time step, the robot 10 is subjected to an excessive force, or the robot moves out of a designated area, the task is interrupted and the initial state is returned to.

While not shown in FIG. 8, the control apparatus 80 may be configured so as to function as the learning apparatus 20 and be able to perform additional machine learning.

Effect Verification

First, the effects of the above described method were confirmed by using a simulation employing a physics engine. A 2D physics engine (Box2D) was used in the simulation.

Figure 9A:
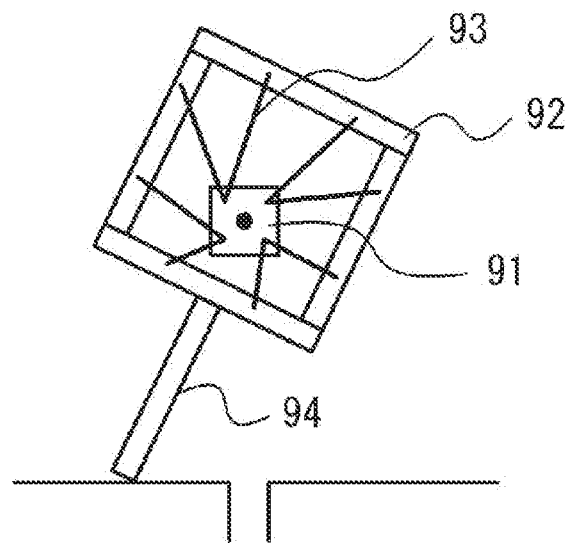
FIGS. 9A, 9B, 9C, and 9D are diagrams illustrating the effects of one or more embodiments.

FIG. 9A is a diagram illustrating a set-up of the simulation. A center square 91 is a portion resembling the robot arm leading end 11a, a frame 92 is a portion resembling the gripper 12, and a protrusion 94 is a portion resembling the peg (gripping target object). The arm and gripper are connected by a spring (elastic body) 93 resembling the flexible portion 13. In the illustrated simulation, the peg is fixed to the gripper.

Under such conditions, the policies for the three MPs [Fit], [Align], and [Insert] were acquired through the above-described model-based machine learning. That is, learning processing in which state space and action space were subjected to dimension reduction (see FIG. 6) was carried out. For comparison, learning processing without dimension reduction was also performed. If dimension reduction is not performed, the state has six dimensions (three degrees of freedom in position and in speed) and the action has two dimension (speeds in horizontal and vertical directions).

Figure 9B:
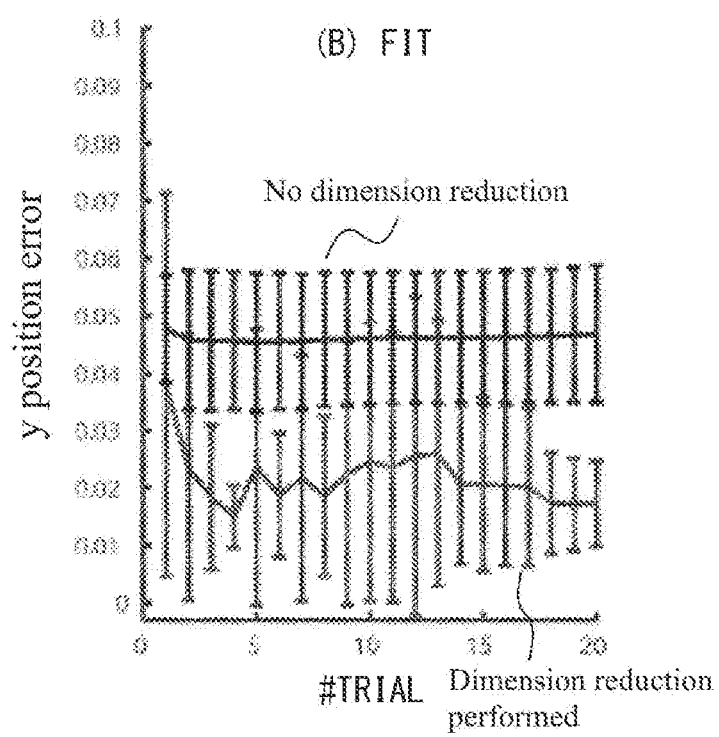
Figure 9C:
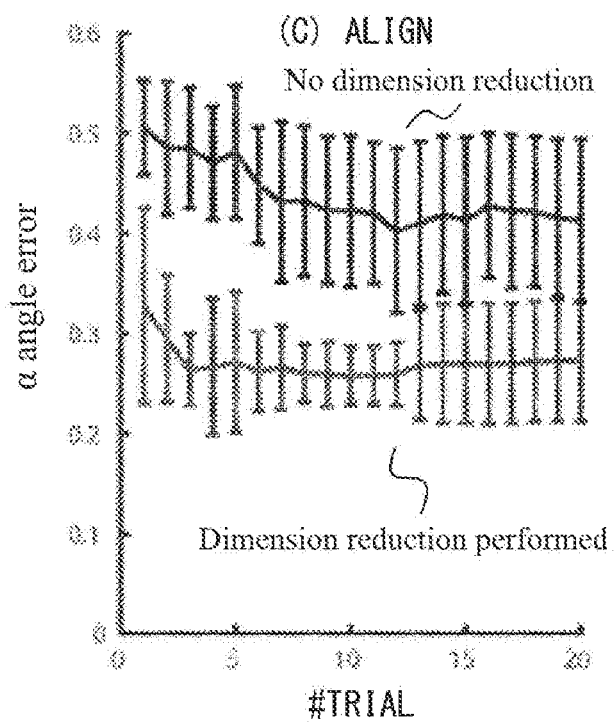
Figure 9D:
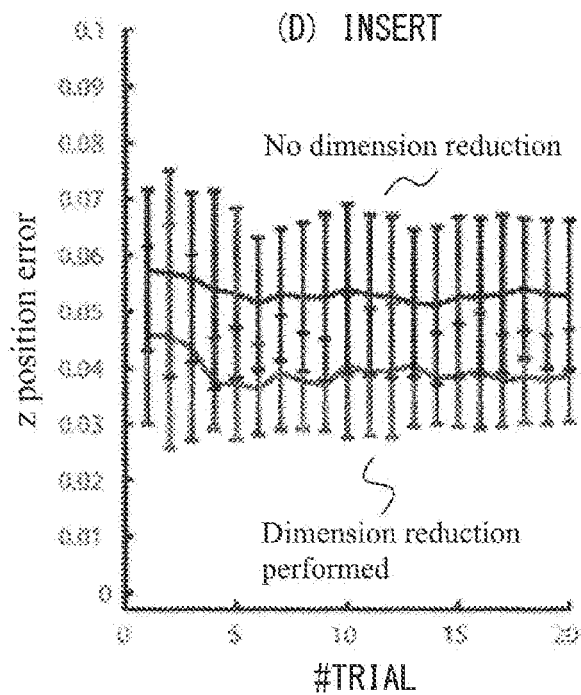

FIGS. 9B to 9D are graphs for each of the [Fit], [Align], and [Insert] MPs that show an error of each trial. The lateral axis shows the number of trials, and the vertical axis shows the error from the target. Learning was performed over 30 sessions, and the polygonal line graphs show the averages of the 30 sessions, and the error bars show the standard deviation.

From these results, regardless of whether dimension reduction is performed or not, it can be understood that each operation has been learned with sufficient accuracy. However, it can be appreciated that performing dimension reduction means that learning can be performed with few trials and with little error.

Next, an experiment was performed using an actual robot. The robot had the structure shown in FIGS. 2A and 2B. Also, a motion capture marker was attached to the gripper 12 thus making it possible to measure the position and orientation of the gripper 12. Further, the peg was fixed to the gripper 12, and thus the position of the peg was obtainable from the position of the gripper 12. Here, only learning including dimension reduction was performed.

Figure 10A:
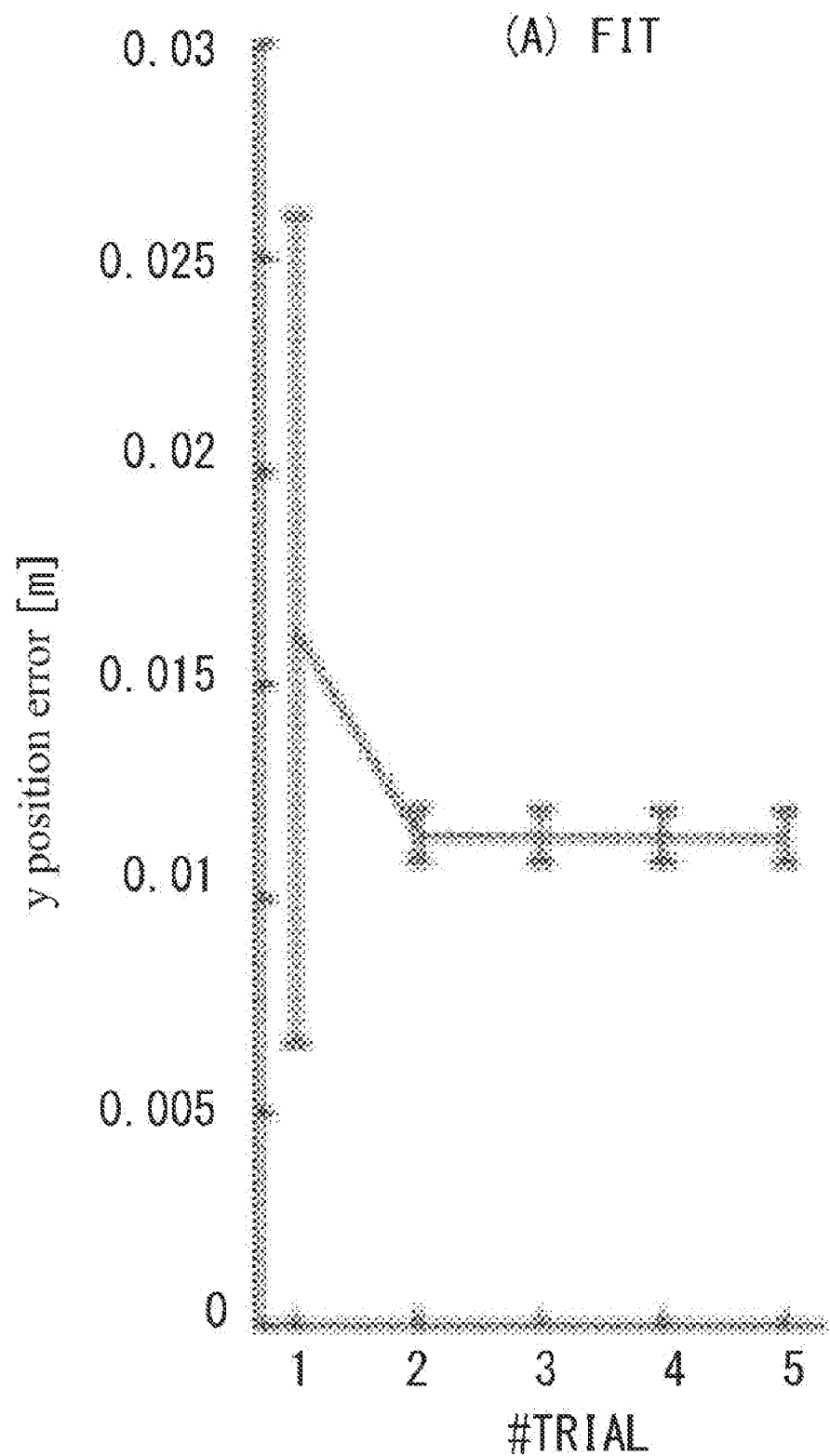
FIGS. 10A, 10B and 10C are diagrams illustrating the effects of one or more embodiments.
Figure 10B:
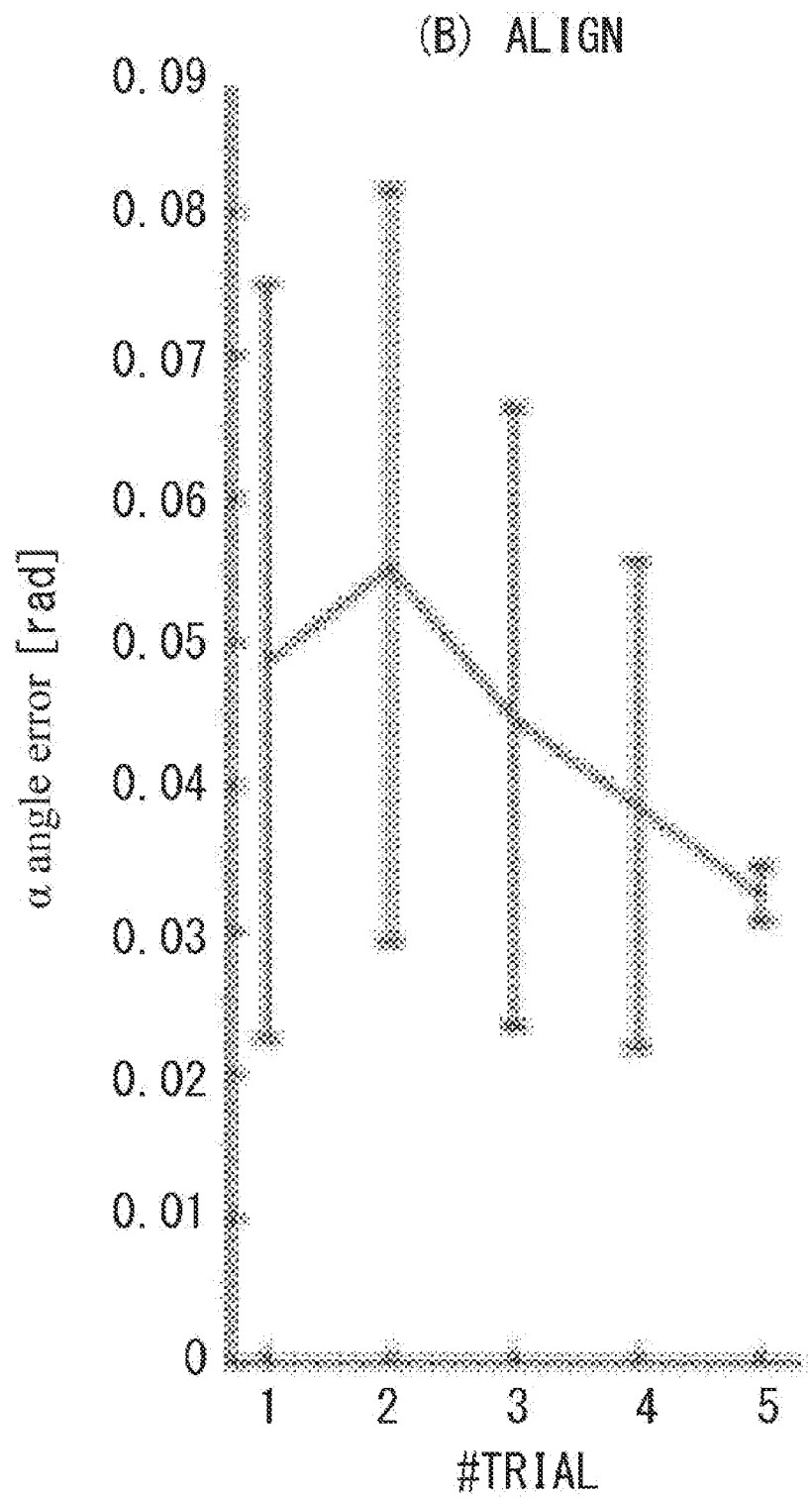
Figure 10C:
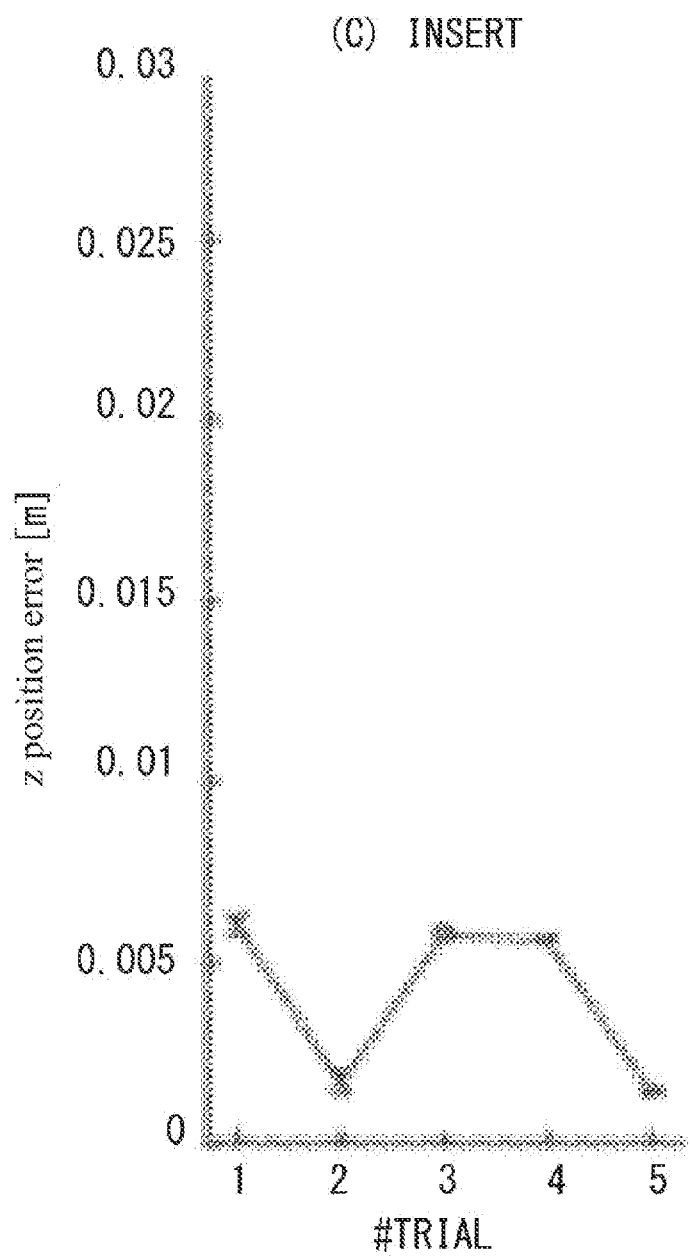

FIGS. 10A to 10C are graphs showing, for each of the [Fit], [Align], and [Insert] MPs, an error at each trial. The horizontal axis shows the number of trials, and the vertical axis shows the error from the target. Learning was performed over 10 sessions, and the polygonal line graphs show the averages of the 10 sessions and the error bars show the standard deviation. It can be understood that, for each of the [Fit], [Align], and [Insert] MPs, the errors were sufficiently reduced within five trials.

Second Embodiment

One or more embodiments is essentially the same as a first embodiment except that a measurement value from a force-related sensor is used as a portion of the state observation data. Specific examples of the force-related sensor and the data obtained by the force-related sensor used in one or more embodiments are described below.

As an example, a tactile sensor that measures a force from the gripping target object acting on the gripper can be used.

Figure 11A:
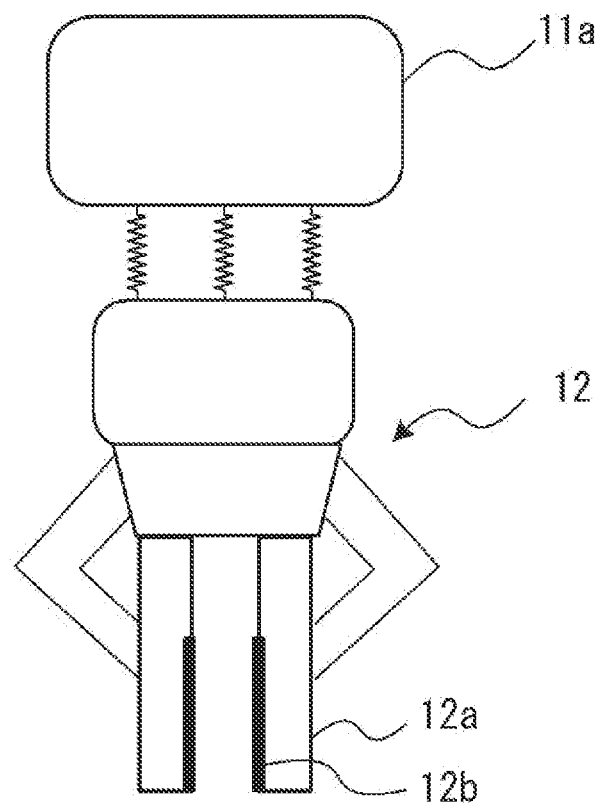
FIGS. 11A, 11B and 11C are diagrams illustrating a tactile sensor.
Figure 11B:
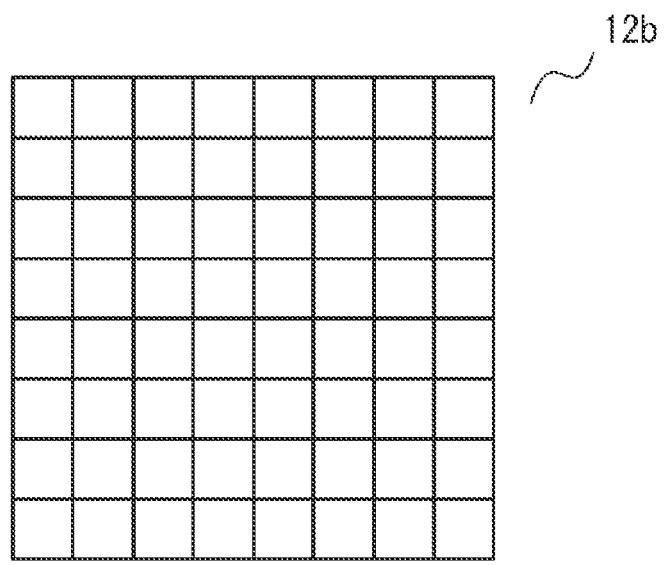

FIGS. 11A and 11B are diagrams illustrating tactile sensors 12b provided on the gripper 12. The tactile sensors 12b are respectively provided on the surfaces of the pair of clamping portions 12a of the gripper 12. The tactile sensors 12b are, for example, six axis, strain gauge tactile sensors produced using micro-machining technology and able to simultaneously detect forces and moment in three directions. The tactile type of sensor may also be called a force sensor. Naturally, a three axis or one axis tactile sensor can be used, and a tactile sensor of another detection principle, for example, a capacitance type, a piezoelectric type, and an optical type may be used. The tactile sensors 12b are distribution tactile sensors formed of 8×8 multicomponent pixels, but a sensor with more or less components may be used, or a single component sensor may also be used.

Using the tactile sensors 12b makes it possible to grasp in what way the gripper 12 is gripping the gripping target object (peg). For example, based on a measurement value of the tactile sensors 12b, it is possible to grasp whether the gripping target object is being gripped vertically or obliquely. Also, based on the difference between measurement values respectively obtained from the tactile sensors 12b of the pair of clamping portions 12a, it is possible to grasp whether the gripper 12 is vertical or oblique. Furthermore, based on measurement values from the tactile sensors 12b, it is possible to grasp, for example, contact between the peg and the target surface, entering of the peg into the hole, the peg being made parallel to the hole, the occurrence of jamming when the peg is inserted into the hole, and the peg being inserted to the bottom of the hole.

Figure 11C:
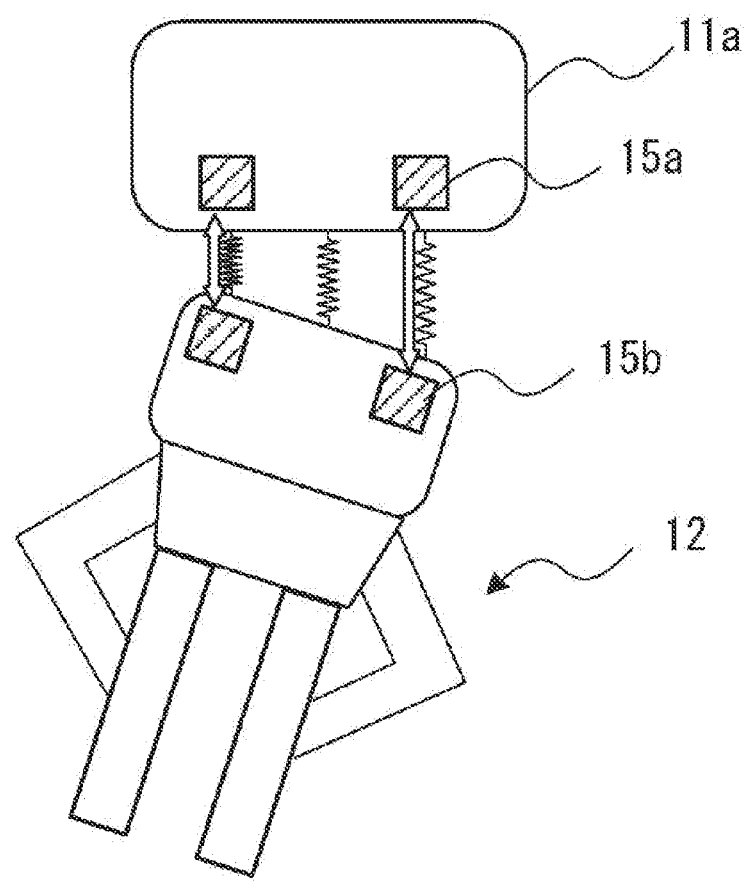

As another example, a force sensor that uses a displacement sensor for measuring a force acting on the flexible portion 13, that is, the portion between the gripper 12 and the arm 11, can be used. FIG. 11C shows displacement sensors 15a and 15b for measuring the distance (displacement) between the arm leading end 11a and the gripper 12. The displacement sensors 15a and 15b measure changes in the distance between each other. A plurality of sets of displacement sensors may be provided on the arm leading end 11a and the gripper 12. Any type of suitable displacement sensor, such as a laser or ultrasound displacement sensor, can be used. The distance between the arm leading end 11a and the gripper 12 correlates to a force that works between the arm leading end 11a and the gripper 12, which are connected by a spring, and thus the displacement sensors 15a and 15b detect the position and orientation of the gripper 12 relative to the arm leading end 11a as well as functioning as force sensors.

Note that a force acting between the gripper 12 and the arm 11 may be measured by using a force sensor such as a strain gauge instead of a displacement sensor.

As yet another example, a force sensor or a torque sensor for measuring a force acting between the flexible portion 13 and the leading end of the gripper 12 (portion in contact with the gripping target portion) can also be used. For example, in the case of a robot hand that has a gripper 12 with a single-jointed or multi-jointed gripping portion, a force acting on the joint(s) of the finger(s) may be measured using a force sensor or a torque sensor.

In the description above, the force acting between the gripper 12 and the arm 11, or alternatively, the force acting between the flexible portion 13 and the leading end of the gripper 12 may include components of a force (a force generated due to gravity and a force generated due to motion acceleration) generated due to the mass of the robot itself closer to the leading end of the gripper than the measurement position of a force.

The force acting on the joints of the robot can also be measured as torque based on the value of a current flowing through a motor that moves the joints of the robot, but measurements performed by a force sensor realized as a strain gauge or the like are more often superior in terms of sensitivity and rapid responsiveness.

The basic algorithm of the learning processing is similar to that in a first embodiment and thus the description is not repeated. According to one or more embodiments, using a force-related sensor makes it possible to more accurately grasp the state of the gripper and the gripping target object further away from the flexible portion, and thus a more appropriate policy can be learned.

Variations

The above described embodiments are nothing more than embodiments for providing an exemplary description of configuration examples of the present invention. The present invention is not to be limited to the above-described specific aspects, and various variations can be made within the technical scope of the present invention.

An example was described where PILCO is used as the learning algorithm, but model-based reinforcement learning other than PILCO may also be used, and model free reinforcement learning may also be used. Also, a learning model may be acquired through supervised learning instead of reinforcement learning. In order to perform supervised learning, teaching data in which correct labels are given to actions in various states needs to be prepared.

In the above described examples, peg fitting work was described as an example, but the learning- and control-target work may be any kind of work. However, one or more embodiments may be suited to work including actions such as those of the gripper itself or the part gripped by the gripper coming into contact with its environment. Also, in the above-described examples, model acquisition is performed through machine learning only in operation sections (MP) where the gripping target object is in contact with its environment, but model acquisition may also be performed through machine learning in operation sections (MP) where the gripping target object or the gripper is not in contact with their environment. Further, in cases where the work is comparatively simple, a model may be acquired through learning without dividing the work into operation sections.

A control apparatus (80) of a robot (10) that is provided with a gripper (12) configured to grip an object and an arm (11) configured to move the gripper (12), and includes a physically flexible portion (13) provided at at least one of an intermediate position of the gripper (12), a position between the gripper (12) and the arm (11), and an intermediate position of the arm (11) according to one or more embodiments may include: a state obtaining unit (81) configured to obtain state observation data including flexible related observation data, which is observation data regarding a state of at least one of the flexible portion (13), a portion of the robot (10) on a side where the object is gripped relative to the flexible portion (13), and the gripped object; and a controller (84) configured to control the robot (10), upon the state observation data being input, by outputting an action to be performed by the robot (10) to perform predetermined work on the object, based on output obtained by the state observation data obtained by the state obtaining unit (81) being input to a learning model (88), the controller (84) including the learning model (88) learned in advance through machine learning.

A robot (10) according to one or more embodiments may include: a gripper (12) configured to grip an object; an arm (11) configured to move the gripper (12); a physically flexible portion (13) provided at at least one of an intermediate position of the gripper (12), a position between the gripper (12) and the arm (11), and an intermediate position of the arm (11); and a force sensor (12b, 15a, 15b) configured to obtain at least one of a force taken on by the gripper (12) from the object or a force acting between the gripper (12) and the arm (11).

A learning apparatus (20) according to one or more embodiments may include: a state obtaining unit (21) configured to obtain flexible related observation data including state observation data, which is observation data regarding a state of at least one of a flexible portion (13) of a robot (10), a portion of the robot (10) on a side where an object is gripped relative to the flexible portion (13), and the gripped object, the robot (10) being provided with a gripper (12) configured to grip the object, an arm (11) configured to move the gripper (12), and including the physically flexible portion (13) provided at at least one of an intermediate position of the gripper (12), a position between the gripper (12) and the arm (11), and an intermediate position of the arm (11); and a learning unit (24) configured to, when the state observation data is input, acquire a learning model that outputs an action to be performed by the robot (10) to perform predetermined work on the object.

A learning apparatus according to one or more embodiments may include: a state obtaining unit configured to obtain flexible related observation data including state observation data, which is observation data regarding a state of at least one of a flexible portion of a robot, a portion of the robot on a side where an object is gripped relative to the flexible portion, and the gripped object, the robot being provided with a gripper configured to grip the object, an arm configured to move the gripper, and including the physically flexible portion provided at least one of an intermediate position of the gripper, a position between the gripper and the arm, and an intermediate position of the arm; and a learning unit configured to, upon receiving the state observation data, acquire a learning model configured to output an action to be performed by the robot to perform predetermined work on the object.

In one or more embodiments, the learning unit may acquire the learning model through reinforcement learning or deep learning.

In one or more embodiments, the learning unit may acquire the learning model through model-based reinforcement learning or model free reinforcement learning.

In one or more embodiments, the predetermined work may include a plurality of motion primitives, and the learning unit is configured to acquire a plurality of learning models corresponding to the plurality of motion primitives.

In one or more embodiments, the learning unit may be configured to acquire the learning model configured to output, for at least one motion primitive of the plurality of motion primitives, an action such that an operation is performed while maintaining a constrained state where the gripper or the object gripped by the gripper is brought into contact with or is near its environment.

In one or more embodiments, the learning unit may be configured to perform learning in which a state space and an action space are subjected to dimension reduction, for the motion primitive controlling the robot so that the constrained state is maintained.

In one or more embodiments, the learning unit may be configured to acquire the learning model configured to output actions, for an entire operation not divided into a plurality of motion primitives or for one motion primitive, including an action such that an operation is performed while maintaining a constrained state where the gripper or the object gripped by the gripper is in contact with or near its environment.

In one or more embodiments, the learning unit may be configured to perform dimension reduction on a state space and an action space and learning regarding control of the robot so that the constrained state is maintained.

In one or more embodiments, the learning unit may comprise: a first learning unit configured to perform learning using state observation data obtained by a person using their body to perform movements or a person operating the robot or a simulation robot; and a second learning unit configured to perform learning using state observation data obtained as a result of an action being performed based on a policy obtained by the first learning unit.

A learning method according to one or more embodiments may comprise: obtaining state observation data including flexible related observation data, which is observation data regarding a state of at least one of a flexible portion, a portion of the robot on a side where the object is gripped relative to the flexible portion, and the gripped object, the robot being provided with a gripper configured to grip the object, an arm configured to move the gripper, and including the physically flexible portion provided at least one of an intermediate position of the gripper, a position between the gripper and the arm, and an intermediate position of the arm; and acquiring, upon receiving the state observation data regarding the robot, a learning model configured to output an action to be performed by the robot to perform predetermined work on the object.

A non-transitory computer-readable storage medium may be provided that stores a program, which when read an executed, causes a computer to perform operations according to one or more embodiments described hereinabove.

The invention claimed is:

1. A control apparatus of a robot comprising:
a state obtaining unit configured to obtain state observation data comprising flexible related observation data, which is observation data regarding a state of at least one of a physically flexible portion, and a portion of the robot on a side of the physically flexible portion where a gripped object is gripped relative to the physically flexible portion, including the gripped object, wherein the robot comprises:
a gripper configured to grip the gripped object,
an arm configured to move the gripper, and
the physically flexible portion provided in at least one of an intermediate position of the gripper at a joint between a gripping surface and the gripper, a position between the gripper and the arm, and an intermediate position of the arm, the physically flexible portion introducing an uncertainty in the position of the gripper and the object; and
a controller configured to control the robot so as to output an action to be performed by the robot to perform predetermined work on the object, in response to receiving the state observation data, based on output obtained as a result of inputting the state observation data obtained by the state obtaining unit to a learning model, the learning model being learned in advance through machine learning and included in the controller, the machine learning comprising learning processing in which a state space of the robot and an action space of the robot are subjected to dimension reduction based on the uncertainty of the position of the gripper and the object introduced by the physically flexible portion.

2. The control apparatus according to claim 1, wherein the predetermined work comprises a plurality of motion primitives, and
the controller comprises a plurality of learning models corresponding to the plurality of motion primitives.

3. The control apparatus according to claim 2, wherein the plurality of motion primitives comprise at least one or more constraining motion primitives that control the robot so as to perform an action while maintaining a constrained state where the gripper or the object gripped by the gripper is brought into contact with or is near its environment.

4. The control apparatus according to claim 2, wherein the physically flexible portion is positioned between the gripper and the arm, and
the flexible related observation data comprises at least one of:
force-related sensing data related to a force taken on by the gripper from the object;
at least one of a position, speed, orientation, and angular velocity of a change in orientation of the gripper;
at least one of a relative distance and a relative angle between the gripper and the arm;
force-related sensing data related to a force taken on by the physically flexible portion; and
data that is based on a captured image of at least one of the object, the gripper, and the physically flexible portion.

5. The control apparatus according to claim 3, wherein the learning model corresponding to the constrained motion primitive is learned through the learning processing in which the state space and the action space are subjected to dimension reduction.

6. The control apparatus according to claim 3, wherein the physically flexible portion is positioned between the gripper and the arm, and
the flexible related observation data comprises at least one of:
- force-related sensing data related to a force taken on by the gripper from the object;
- at least one of a position, speed, orientation, and angular velocity of a change in orientation of the gripper;
- at least one of a relative distance and a relative angle between the gripper and the arm;
- force-related sensing data related to a force taken on by the physically flexible portion; and
- data that is based on a captured image of at least one of the object, the gripper, and the physically flexible portion.

7. The control apparatus according to claim 5, wherein the physically flexible portion is positioned between the gripper and the arm, and
the flexible related observation data comprises at least one of:
- force-related sensing data related to a force taken on by the gripper from the object;
- at least one of a position, speed, orientation, and angular velocity of a change in orientation of the gripper;
- at least one of a relative distance and a relative angle between the gripper and the arm;
- force-related sensing data related to a force taken on by the physically flexible portion; and
- data that is based on a captured image of at least one of the object, the gripper, and the physically flexible portion.

8. The control apparatus according to claim 1, wherein the learning model outputs actions, for an entire operation not divided into a plurality of motion primitives or for one motion primitive, including an action such that an operation is performed while maintaining a constrained state where the gripper or the object gripped by the gripper is in contact with or near the environment.

9. The control apparatus according to claim 8, wherein the learning model regarding control of the robot while maintaining the constrained state is learned through the learning processing in which the state space and the action space are subjected to dimension reduction.

10. The control apparatus according to claim 8, wherein the physically flexible portion is positioned between the gripper and the arm, and
the flexible related observation data comprises at least one of:
- force-related sensing data related to a force taken on by the gripper from the object;
- at least one of a position, speed, orientation, and angular velocity of a change in orientation of the gripper;
- at least one of a relative distance and a relative angle between the gripper and the arm;
- force-related sensing data related to a force taken on by the physically flexible portion; and
- data that is based on a captured image of at least one of the object, the gripper, and the physically flexible portion.

11. The control apparatus according to claim 9, wherein the physically flexible portion is positioned between the gripper and the arm, and
the flexible related observation data comprises at least one of:
- force-related sensing data related to a force taken on by the gripper from the object;
- at least one of a position, speed, orientation, and angular velocity of a change in orientation of the gripper;
- at least one of a relative distance and a relative angle between the gripper and the arm;
- force-related sensing data related to a force taken on by the physically flexible portion; and
- data that is based on a captured image of at least one of the object, the gripper, and the physically flexible portion.

12. The control apparatus according to claim 1, wherein the physically flexible portion is positioned between the gripper and the arm, and
the flexible related observation data comprises at least one of:
- force-related sensing data related to a force taken on by the gripper from the object;
- at least one of a position, speed, orientation, and angular velocity of a change in orientation of the gripper;
- at least one of a relative distance and a relative angle between the gripper and the arm;
- force-related sensing data related to a force taken on by the physically flexible portion; and
- data that is based on a captured image of at least one of the object, the gripper, and the physically flexible portion.

13. A robot system comprising:
a robot comprising:
- a gripper configured to grip an object;
- an arm configured to move the gripper;
- a physically flexible portion provided at least one of an intermediate position of the gripper, a position between the gripper and the arm, and an intermediate position of the arm; and
the control apparatus according to claim 1.

14. A robot comprising:
a gripper configured to grip an object;
an arm configured to move the gripper;
a physically flexible portion provided in at least one of an intermediate position of the gripper at a joint between a gripping surface and the gripper, a position between the gripper and the arm, and an intermediate position of the arm, the physically flexible portion introducing an uncertainty in the position of the gripper and the object; and
a sensor configured to detect a state of at least one of the flexible portion, a portion of the robot on a side where the object is gripped relative to the flexible portion, and a gripped object, wherein
the robot receives an action to perform predetermined work on the object, based on state observation data comprising flexible related observation data comprising observation data regarding a state of at least one of the physically flexible portion, and a portion of the arm on a side of the physically flexible portion where the object is gripped relative to the physically flexible portion and including the gripped object, the action based on inputting the state observation data to a learning model learned in advance through machine learning comprising learning processing in which a state space of the robot and an action space of the robot are subjected to dimension reduction based on the uncertainty of the position of the gripper and the object introduced by the physically flexible portion.

15. A control method of controlling a robot, comprising:
(i) obtaining state observation data comprising flexible related observation data regarding a state of at least one of a physically flexible portion, and a portion of the robot on a side of the physically flexible portion where an object is gripped relative to the physically flexible portion, and including the gripped object,
wherein robot is provided with a gripper configured to grip the object and an arm configured to move the gripper, and comprises the physically flexible portion provided in at least one of an intermediate position of a gripper at a joint between a gripping surface and the gripper, a position between the gripper and the arm, and an intermediate position of the arm, the physically flexible portion introducing an uncertainty in a position of the gripper and the object; and
(ii) controlling the robot so as to output an action to be performed by the robot to perform predetermined work on the object, in response to receiving the state observation data, based on output obtained from the state observation data obtained in operation (i), by using a learning model learned in advance through machine learning, the machine learning comprising learning processing in which a state space of the robot and an action space of the robot are subjected to dimension reduction based on the uncertainty of the position of the gripper and the object introduced by the physically flexible portion.

16. A non-transitory computer-readable storage medium storing a program for controlling a robot, which when read an executed, causes a computer to perform operations according to the control method of claim 15.

* * * * *